(12) United States Patent
Kubota et al.

(10) Patent No.: US 6,783,889 B2
(45) Date of Patent: Aug. 31, 2004

(54) POLYESTER FILM AND MAGNETIC RECORDING MEDIUM USING THE SAME

(75) Inventors: Akira Kubota, Otsu (JP); Kenichi Eto, Takatsuki (JP); Yukari Nakamori, Shiga (JP); Tetsuya Tsunekawa, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 10/002,126

(22) Filed: Dec. 5, 2001

(65) Prior Publication Data

US 2002/0114977 A1 Aug. 22, 2002

(30) Foreign Application Priority Data

Dec. 13, 2000 (JP) ........................................ 2000/378814
Dec. 13, 2000 (JP) ........................................ 2000/378815

(51) Int. Cl.$^7$ ................................................ G11B 5/66
(52) U.S. Cl. .................... 429/141; 428/212; 428/473.5; 428/474.4; 428/694 SG; 428/900; 427/128; 427/129; 427/130; 427/131
(58) Field of Search ................................ 428/141, 212, 428/473.5, 474.4, 684 SG, 900, 684 ST, 684 SL; 427/128, 129, 130, 131

(56) References Cited

U.S. PATENT DOCUMENTS 5,686,166 A * 11/1997 Tsukuda et al. ............ 428/141

FOREIGN PATENT DOCUMENTS

EP 0 985 701 A1 3/2000
EP 0985701 A1 * 3/2001

OTHER PUBLICATIONS

Database WPI, Section Ch, Week 200135; Derwent Publications Ltd., London, GB; AN 2001–331222; XP002192553; JP 2000–355631 A (Toray Ind. Inc.); Dec. 26, 2000.
Database WPI, Section Ch, Week 199345; Derwent Publications Ltd., London, GB; AN 1993–354367; XP002192554; JP 05–258290 A (Sony Corp.); Oct. 8, 1993.
Database WPI, Section Ch, Week 200214; Derwent Publications Ltd., London, GB; AN 2002–099885; XP002192555; JP 2001–243615 A (Toray Ind. Inc.); Sep. 7, 2001.
Database WPI, Section Ch, Week 199827; Derwent Publications Ltd., London, GB; AN 1998–306155; XP002192556; JP 10–110045 A (Toray Ind. Inc.); Apr. 28, 1998.

* cited by examiner

Primary Examiner—Leszek B Killiman
(74) Attorney, Agent, or Firm—Kubovcik & Kubovcik

(57) ABSTRACT

The present invention provides a polyester film, which is composed of a polyester resin and a polyimide resin, having superior oligomer-restraining property and dimensional stability. This polyester film also has improved surface conditions, that is, has a reduced number of projections on the surface, and hence, the polyester film shows superior electromagnetic conversion characteristics when used for magnetic recording media. In particular, this polyester film is effectively used for high-density magnetic recording media. This film is composed of a polyester resin and a thermoplastic resin other than a polyester resin, and has a number H1 of coarse projections 0.28 μm or more in height of 0 to 100/100 cm$^2$ on at least one surface of the polyester film and a number H2 of coarse projections 0.56 μm or more in height of 0 to 10/100 cm$^2$ on the same surface.

31 Claims, No Drawings

POLYESTER FILM AND MAGNETIC RECORDING MEDIUM USING THE SAME

BACKGROUND OF THE INVENTION

1. Field of the Invention

The present invention relates to polyester films having superior quality, in particular, having significantly improved dimensional stability and surface properties compared to conventional polyester films.

2. Description of the Related Art

Polyester films have been widely used due to their superior thermal properties, dimensional stability, mechanical properties, and controllability of surface conditions, and in particular, it has been well known that polyester films have been useful as a base film for forming magnetic tapes or the like. In recent years, higher density recording has been required for magnetic tapes for achieving the trend towards the reduction in material weight, miniaturization, and longer recording time. In order to fulfill the requirements for this higher density recording, it is effective to shorten the recording wavelength, that is, to compress the recording signals.

However, when recording signals are compressed, various properties, such as heat dimensional stability in environments in which the tapes are used, finer surface projections, and reduction in the number of coarse projections, are required for the base film.

First, when recording signals are compressed, there has been a problem in that recording track deviation is likely to occur due to heat generated when the magnetic tape runs or due to heat distortion of the magnetic tape which occurs during storage. Accordingly, improved characteristics, such as heat dimensional stability and storage stability in environments in which the tapes are used, have been increasingly required.

In addition, in the case of a magnetic tape having a deposited magnetic layer, a significant decrease in thickness of the magnetic layer is very effective to compress the recording signals for obtaining improved electromagnetic conversion characteristics; however, in accordance with the decrease in thickness of the film, the surface conditions of the base film have an increased influence on the surface conditions of the magnetic tape. Accordingly, reduction in height of surface projections, formation of smoother surfaces, and accurate control of the surface roughness of the base tape are increasingly required.

In addition, it also becomes more important to suppress the degradation of film flatness caused by heat in a step of coating or depositing a magnetic layer and to suppress the degradation of film quality caused by precipitation of oligomers.

Furthermore, concomitant with the trend toward the compression of recording signals, the sensitivity of a recording head which reads the recording signals must be improved, and hence, in place of conventional heads, highly sensitive magnetic resistance (MR) heads must be used. However, the MR heads have inferior abrasion resistance compared to the conventional heads. In addition, since the distance between the head and the magnetic tape is being decreased significantly in order to reduce the gap loss, the problem of coarse projections damaging the magnetic head becomes more serious, and hence, a reduction in coarse projections has been increasingly demanded.

That is, development of a film having a surface which can satisfy the requirements of dimensional stability, surface smoothness, and reduction in coarse projections has been desired.

As a base film which can meet the dimensional stability requirement described above, aramid films have been used in view of their strength and dimensional stability. Even though the aramid films have cost and productivity disadvantages, that is, even though the aramid films are expensive and are not molded by melting extrusion as a conventional poly(ethylene terephthalate) resin is, the aramid films have been used since there has been no alternative material.

Through intensive research, as a technique for improving the dimensional stability of a biaxially oriented polyester film having high productivity, a biaxially oriented polyester film (for example, Japanese Unexamined Patent Application Publication No. 12-141475) formed of poly(ethylene terephthalate) and poly(ether imide) has been developed.

However, since the biaxially oriented polyester film described above has melt viscosity or the like which is considerably different from that of the conventional polyester represented by poly(ethylene terephthalate), when a conventional film-forming method is used, voids are easily formed around particles added to the polyester described above. In addition to that, due to poor dispersibility or the like between two different polymers, coarse projections may be formed, and hence, there has been a problem in that it is difficult to accurately control the surface conditions which are preferably used for a high-density magnetic recording medium.

In addition, as a method for obtaining high surface quality, there may be mentioned, for example, a method for forming a laminated polyester film (for example, Japanese Unexamined Patent Application Publication No. 7-272249) containing particles for forming surface projections or a method for coating a non-continuous film (Japanese Unexamined Patent Application Publication No. 3-208639) containing fine particles. However, among the requirements which will be further demanded for polyester films due to the inferior heat resistance thereof, there may be still problems in that wrinkles are generated or oligomers are precipitated due to heat applied in a deposition step.

Concerning the above-mentioned biaxially oriented polyester film composed of a poly(ethylene terephthalate) and poly(ether imide), a method for obtaining the surface conditions which are preferably used for high-density magnetic recording medium has not been known at all. In the case in which the method described above for improving the surface quality is applied to this film, there have been various problems, such as coating mottle caused by difference in wettability of the polymer surfaces or by difference in affinity between a coating solution and the polymer; an inferior lamination state caused by difference in melt viscosity between the two polymers; and the formation of coarse projections described above. For the film composed of polyester and poly(ether imide), a method (for example, Japanese Unexamined Patent Application Publication No. 12-355631) for reducing coarse projections (H2) having a height of 0.5 μm or more has been known; however, the level of control of the surface conditions by the method described above is far from that which can be satisfactory applied to future high-density magnetic recording media.

SUMMARY OF THE INVENTION

Accordingly, an object of the present invention is to provide a polyester film which has superior dimensional stability and a superior property of restraining the precipitation of oligomers (hereinafter referred to as "oligomer-restraining property) and which also has a reduced number of coarse projections formed by voids around particles, coarse dispersed materials, degraded materials, contaminants, and the like. In particular, when the polyester film described above is used as a base film for a magnetic recording medium, track deviation or dropouts are unlikely to occur, and superior running durability, electromagnetic conversion characteristics, deposition stability, and the like can be obtained, whereby the polyester film of the present invention can be preferably used as a base film for a high-density magnetic recording tape.

The object of the present invention is achieved by a film formed of a polyester resin and a thermoplastic resin other than a polyester resin, in which the number H1 of coarse projections having a height of 0.28 μm or more per 100 cm² of at least one surface of the polyester film and the number H2 of coarse projections having a height of 0.56 μm or more per 100 cm² of said at least one surface of the polyester film satisfy the equations, $0 \leq H1 \leq 100$ and $0 \leq H2 \leq 10$.

In addition, the film described above can be formed of a laminated polyester film having at least two layers composed of a laminated portion (B layer) laminated on at least one surface of a base layer portion (A layer) formed of a polyester resin (polymer 1) and a thermoplastic resin (polymer 2) other than a polyester resin.

DESCRIPTION OF THE PREFERRED EMBODIMENTS

A polyester film of the present invention is formed of a polymer alloy comprising a polyester resin (polymer 1) and a thermoplastic resin (polymer 2) other than a polyester resin as essential components.

The polymer alloy mentioned in the present invention means a polymeric material containing at least two components, and-it may be a block copolymer formed by a copolymerization or a polymer blend obtained by mixing or the like. However, the polymer alloy is not a polymeric material containing polystyrene particles or polymethyl methacrylate particles that are externally added.

In the present invention, unless particularly stated otherwise, "primary component" or "essential component" means that the component occupies 80% or more of the total, and for example, in the case described above, it means that the total amount of the polymer 1 and the polymer 2 occupies 80% or more of the film of the present invention.

The orientation (non-orientation, uniaxial orientation, or biaxial orientation) of the polyester film of the present invention differs depending on applications; however, when the polyester film is particularly used for a magnetic recording medium, it is preferable that at least one layer constituting the polyester film be biaxially oriented. When all layers are non-oriented or are uniaxially oriented, the properties required for a magnetic recording medium cannot be obtained.

The polyester resin (polymer 1) of the present invention is a polymer which consists of polyester units formed of a diol component and an acid component, such as an aromatic dicarboxylic acid, an alicyclic dicarboxylic acid, or an aliphatic dicarboxylic acid.

As the aromatic dicarboxylic acid, for example, terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenyl ether dicarboxylic acid, 4,4'-diphenyl sulfone dicarboxylic acid, or the like may be used. Preferably, terephthalic acid, phthalic acid, 2,6-naphthalene dicarboxylic acid may be used. As the alicyclic dicarboxylic acid, for example, cyclohexane dicarboxylic acid may be used. As the aliphatic dicarboxylic acid, for example, adipic acid, suberic acid, sebacic acid, or dodecane dionic acid may be used. Among those described above, terephthalic acid, 2,6-naphthalene dicarboxylic acid, or the like may be preferably used. In particular, terephthalic acid may be more preferably used. These acid components may be used alone or in combination.

As the diol component, for example, ethylene glycol, 1,2-propanediol, 1,3-propanediol, neopentyl glycol, 1,3-butanediol, 1,4-butanediol, 1,5-pentanediol, 1,6-heanediol, 1,2-cyclohexane dimethanol, 1,3-cyclohexane dimethanol, 1,4-cyclohexane dimethanol, diethylene glycol, triethylene glycol, polyalkylene glycol, or 2,2'-bis(4'-(β-hydroxyethoxy)phenyl)propane may be used; among those mentioned above, ethylene glycol, 1,4-butanediol, 1,4-cyclohexasne dimethanol, and diethylene glycol and the like may be preferably used; and in particular, ethylene glycol may be more preferably used. These diol components may be used alone of in combination.

As the polyester resin (polymer 1) of the present invention, in particular, poly(ethylene terephthalate) (PET) and poly(ethylene-2,6-naphthalene dicarboxylate) (PEN) may be preferably mentioned by way of example, and in view of the melt moldability, poly(ethylene terephthalate) is most preferable.

In addition, the polyester resin (polymer 1) may be a copolymer formed of a poly functional compound, such as trimellitic acid, pyromellitic acid, glycerol, pentaerythritol, or 2,4-dihydroxybenzoic acid; a monofunctional compound, such as lauryl alcohol or phenyl isocyanate; aromatic hydroxyl carboxylic acid, such as p-hydroxy benzoic acid, m-hydroxy benzoic acid, or 2,6-hydroxyl-naphthoic acid; or amino derivative, such as p-amionophenol or p-aminobenzoic acid, as long as the content thereof should not impair the advantage of the present invention.

The thermoplastic resin (polymer 2) of the present invention is a thermoplastic resin other than a polyester resin. A polyester resin is not preferably used as the polymer 2 since the effect of improving the dimensional stability is not significant. The reasons for this is believed that the effect of restraining molecular movement of a polyester resin is decreased since the thermal properties, such as the glass transition temperatures, of the two polyester resins are close to each other, or an ester exchange reaction occurs between the two different types of polyester resins.

The polymer 2 of the present invention preferably has a glass transition temperature (Tg) higher than that of the polymer 1. When the Tg of the polymer 2 is higher, the effect of restraining the molecular movement of the polymer 1 caused by heat is increased, and hence, the heat dimensional stability tends to be improved.

The polymer 2 of the present invention preferably has superior affinity (compatibility) to the polymer 1. When the polymer 1 and the polymer 2 have not superior affinity to each other, dispersed domains of polymers become coarse, and coarse projections are easily formed on the film surface. The superior affinity (compatibility) described above means that, for example, a structure 200 nm or more in diameter (for example, coarsely dispersed polymer domain), which is not caused by additives such as externally added particles, is not observed when the cross-section of an unstretched film or a biaxially stretched film formed by using a polymer alloy of the polymer 1 and the polymer 2 is observed using a transmission electron microscope at a magnification of 30,000 to 500,000. However, the method for evaluating the affinity between the polymer 1 and the polymer 2 is not limited thereto. In addition, when necessary, superior affinity may be determined when a single glass transition temperature is observed by a temperature modulated differential scanning calorimeter (DSC).

As the polymer 2 of the present invention, in view of the superior affinity to a polyester resin and improvement of the dimensional stability by restraining molecular movement of the polyester resin, a polyimide resin (including a poly(ether imide) resin), a polysulfone resin, and a poly(ether sulfone) resin may be preferably mentioned by way of example. These thermoplastic resins mentioned above may be used alone or in combination.

In addition, it is preferable that a compatibilizer be also used when necessary, since dispersed domain diameters can be controlled, and the formation of coarse projections can also be restrained. In the case described above, the type of compatibilizer may be optionally selected depending on the type of polymer, and the addition amount is preferably in the range of 0.01 to 10 wt %.

A polyimide resin used as the polymer 2 of the present invention is not specifically limited as long as it has superior affinity to the polymer 1 and has the melt moldability, and for example, a polyimide resin containing a structural unit represented by the formula below may be preferably used.

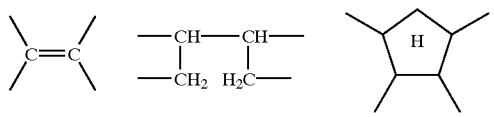

In the formula described above, $R_1$ indicates at least one selected from the group consisting of aliphatic hydrocarbon groups, alicyclic hydrocarbon groups, and aromatic hydrocarbon groups as shown below by way of example.

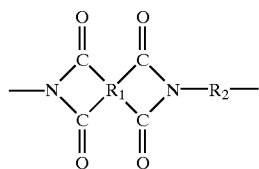

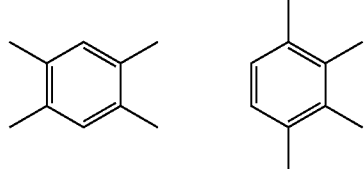

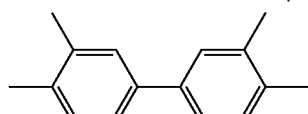

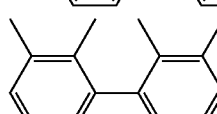

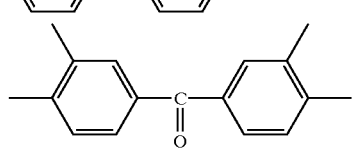

-continued

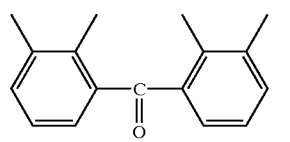

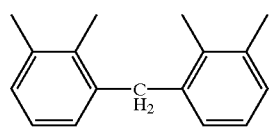

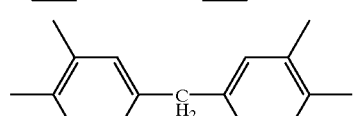

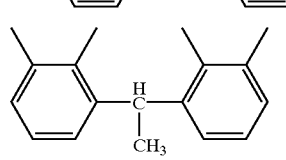

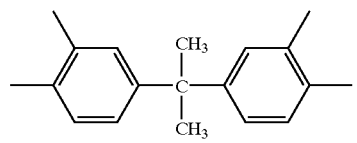

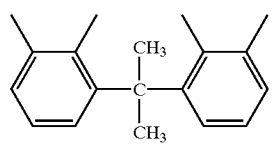

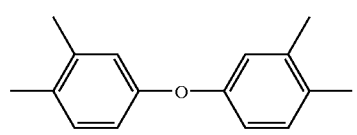

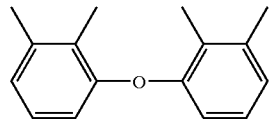

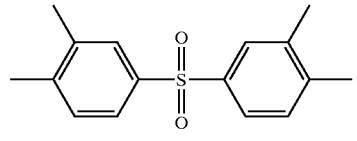

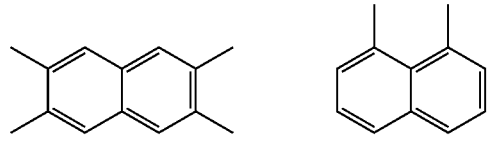

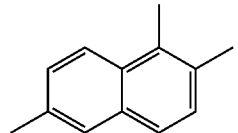

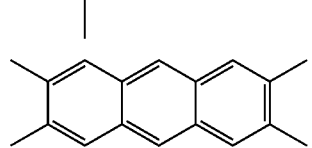

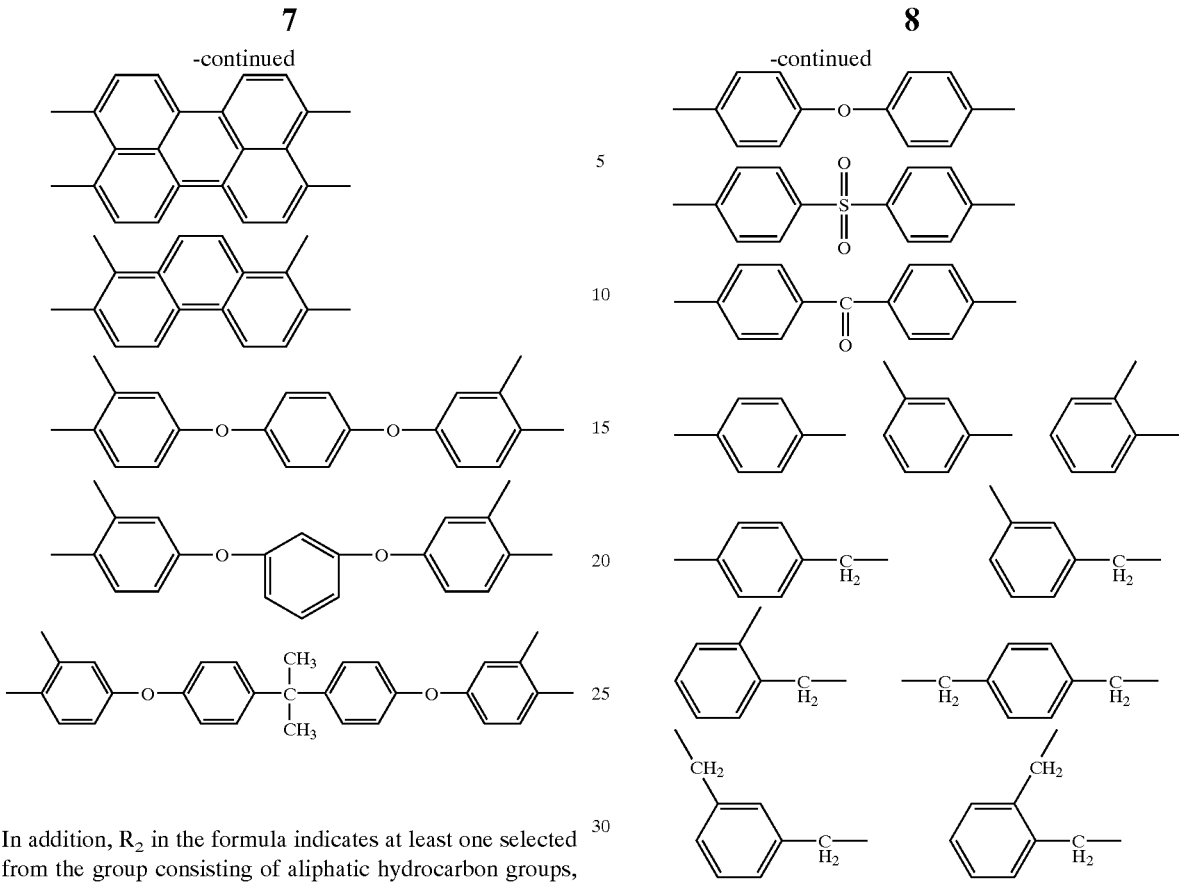

In addition, $R_2$ in the formula indicates at least one selected from the group consisting of aliphatic hydrocarbon groups, alicyclic hydrocarbon groups, and aromatic hydrocarbon groups as shown below by way of example.

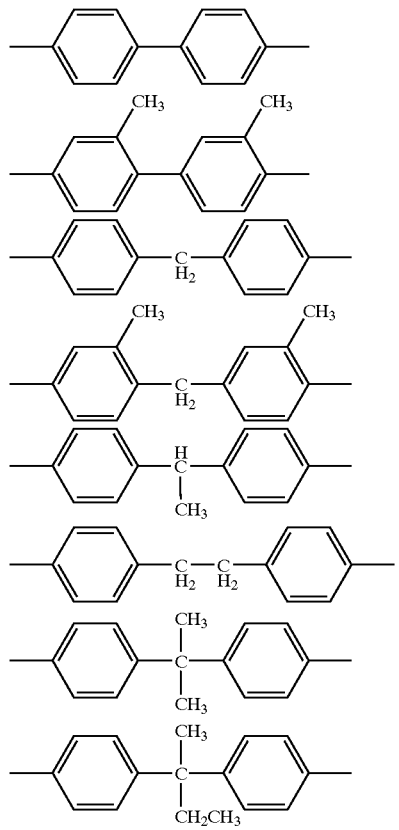

The polyimide resins mentioned above may be formed by dehydrating condensation of a tetracarboxylic acid and/or an anhydride thereof and at least one compound selected from the group consisting of an aliphatic primary monoamine, an aromatic primary monoamine, an aliphatic primary diamine, and an aromatic primary diamine.

As the tetracarboxylic acid and the anhydride thereof, for example, there may be mentioned ethylene tetracarboxylic acid, 1,2,3,4-butane tetracarboxylic acid, cyclopentane tetracarboxylic acid, pyromellitic acid, 1,2,3,4-benzene tetracarboxylic acid, 3,3',4,4'-biphenyl tetracarboxylic acid, 2,2', 3,3'-biphenyl tetracarboxylic acid, 3,3',4,4'-benzophenone tetracarboxylic acid, 2,2',3,3'-benzophenone tetracarboxylic acid, bis(2,3-dicarboxylphenyl)methane, bis(3,4-dicarboxylphenyl)methane, 1,1'-bis(2,3-dicarboxylphenyl) ethane, 2,2'-bis(3,4-dicarboxylphenyl)propane, 2,2'-bis(2,3-dicarboxylphenyl)propane, bis(3,4-dicarboxylphenyl)ether, bis(2,3-dicarboxylphenyl)ether, bis(3,4-dicarboxylphenyl) sulfone, bis(2,3-dicarboxylphenyl)sulfone, 2,3,6,7-naphthalene tetracarboxylic acid, 1,4,5,8-naphthalene tetracarboxylic acid, 1,2,5,6-naphthalene tetracarboxylic acid, 2,3,6,7-anthracene tetracarboxylic acid, 1,2,7,8-phenanthrene tetracarboxylic acid, 3,4,9,10-perylene tetracarboxylic acid, 4,4'-(p-phenylenedioxy)diphthalic acid, 4,4'-(m-phenylenedioxy)diphthalic acid, 2,2'-bis[(2,3-dicarboxylphenoxy)phenyl]propane, and anhydrides thereof.

As the aliphatic primary monoamine, for example, a saturated or an unsaturated linear, branched, or alicyclic monoamine having two to twenty-two carbon atoms is used. In particular, ethylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, nonadecylamine, icosylamine, henicosylamine, docosylamine, cyclohexylamine, methycyclohexylamine, dimethylcyclohexylamine, diethylcyclohexylamine, and the structural isomers thereof may be used.

As the aromatic primary monoamine, for example, primary aniline which is not substituted or substituted by an alkyl group having one to twenty-two carbon atoms is used. In particular, aniline, toluidine, ethylaniline, propylaniline, butylaniline, pentylaniline, hexylaniline, heptylaniline, octylaniline, nonylaniline, decylaniline, undecylaniline, dodecylaniline, tridecylaniline, tetradecylaniline, pentadecylaniline, hexadecylaniline, heptadecylaniline, octadecylaniline, nonadecylaniline, icosylaniline, henicosylaniline, docosylaniline, and the structural isomers thereof may be used.

As the aliphatic primary diamine, for example, a primary diamine formed of repeated methylene units containing at least one to twelve carbon atoms or diamine having an alicyclic group is used. In particular, ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, 1,3-bisaminocyclohexane, diaminodicyclohexylmethane, m-xylenediamine, and the structural isomers thereof may be used.

As the aromatic primary diamine, for example, benzidine, dimethylbenzidine, diaminodiphenylmethane, diaminoditolylmethane, diaminodiphenylethane, diaminodiphenylpropane, diaminodiphenylbutane, diaminodiphenyl ether, diaminodiphenyl sulfone, diaminodiphenylbenzophenone, o,m,p-phenylenediamines, tolylenediamine, xylenediamine, and an aromatic primary diamine having a structural unit of the diamine mentioned above may be used.

In view of the melt moldability and processability with a polyester resin, and restraint of the generation of coarse dispersed materials, a poly(ether imide) resin having the polyimide structure containing an ether bond represented by the formula below is particularly preferable.

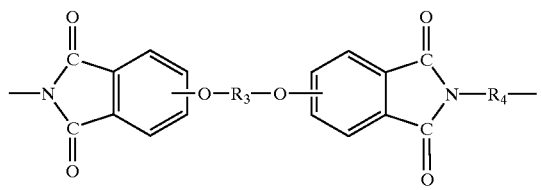

(In the formula above, $R_3$ is a divalent aromatic or a divalent aliphatic residue having six to thirty carbon atoms, $R_4$ is a divalent organic group selected from the group consisting of a divalent aromatic residue having six to thirty carbon atoms, an alkylene group having two to twenty carbon atoms, a cycloalkylene group having two to twenty carbon atoms, and a polydiorganosiloxane group terminated by alkylene groups having two to eight carbon atoms.)

As $R_3$ and $R_4$ described above, for example, the aromatic residues represented by the formulas below may be mentioned.

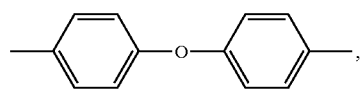

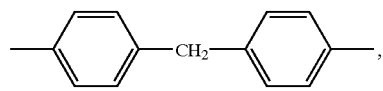

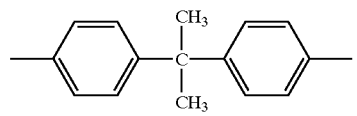

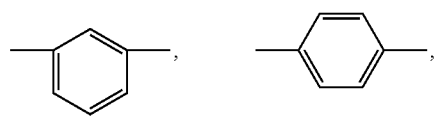

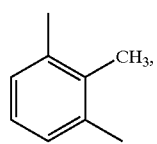

In addition, —$(CH_2)_m$— (m is 1 or an integer of more than 1) may also be mentioned.

In the present invention, in view of the affinity to the polyester resin (polymer 1), cost, melt moldability, and the like, a polymer having a repeating unit represented by the formula below, that is, a condensation product of 2,2-bis[4-(2,3-dicarboxylphenoxy)phenyl]propane dianhydride and m-phenylenediamine or p-phenylenediamine, is preferable.

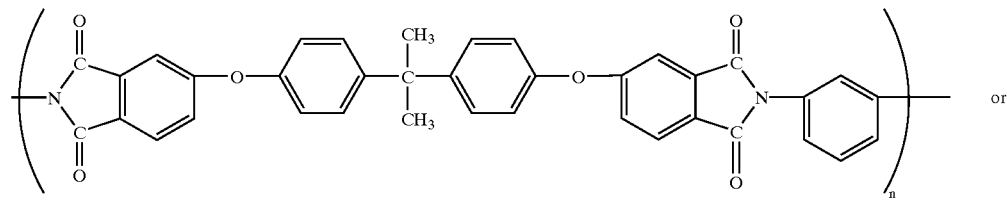

or

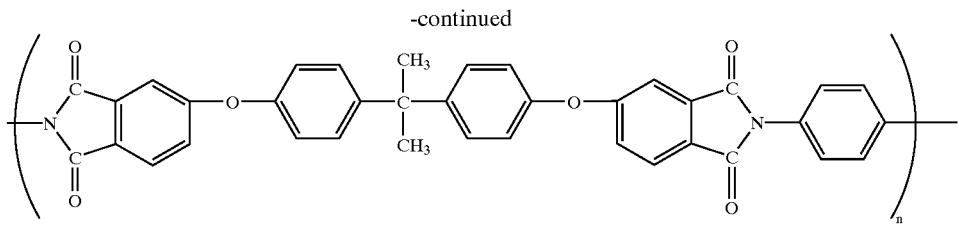

(In the above formula, n is an integer of more than 1 and is preferably an integer of 20 to 50.)

This poly(ether imide) resin is commercially available under the tradename "Ultem" sold by GE Plastic K.K.

The poly(ether sulfone) used as the polymer 2 of the present invention is a polymer having a repeating unit represented by the formula below in which aromatic rings, one sulfonic group, and one or two ether groups are bonded as shown below, and this poly(ether sulfone) may be copolymerized so as to include another structural unit to some extent.

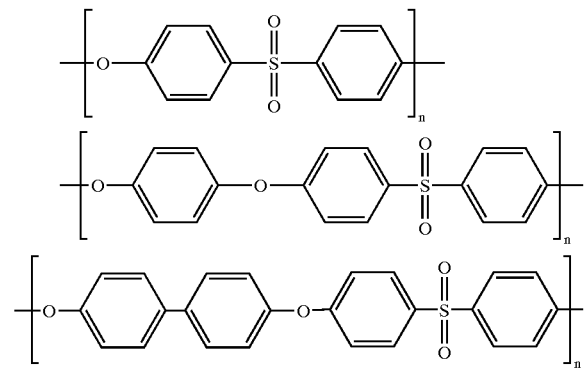

(In the above formulas, n is an integer of more than 1)

The polysulfone used as the polymer 2 of the present invention is a polymer having a repeating unit represented by the formula below in which a functional group such as an alkyl group may-be included, or the polysulfone may be copolymerized so as to include another structural unit to some extent.

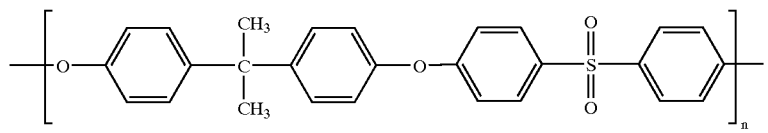

(In the above formulas, n is an integer of more than 1)

The affinity (compatibility) between the polymer 1 and the polymer 2 of the present invention largely depends on the combination of the polymer 1 and the polymer 2, and among the polymers described above, combinations between poly(ethylene terephthalate) and poly(ether imide), poly(ethylene terephthalate) and polysulfone, poly(ethylene-2,6-naphthalenedicarboxylate) and poly(ether imide), poly(ethylene-2,6-naphthalenedicarboxylate) and polysulfone, and poly(ethylene-2,6-naphthalenedicarboxylate) and poly(ether sulfone) particularly show superior affinity therebetween. Among the combinations mentioned above, in view of the melt moldability, alloy stability in a molten state, and improvement in dimensional stability, the combination between poly(ethylene terephthalate) and poly(ether imide) may be mentioned as the most preferable combination by way of example.

In the present invention, the polymer 2 may be added to the polymer 1 before the polymer 1 is formed, for example, before esterification is performed, or may be added after the polymer 1 is formed by polymerization. In addition, the polymer 1 and the polymer 2 may be mixed and pelletized before melting extrusion is performed.

As another method for obtaining a preferably dispersed condition of the polymer alloy of the present invention, for example, there may be mentioned a method for mixing using a tandem extruder, a method for finely dispersing the polymer 2 using at least two polyester resins, a method for mixing a powdered polymer 2 which is pulverized by a pulverizer beforehand, a method for mixing both polymers which are dissolved in a solvent and are then coprecipitated, and a method in which a polymer dissolved in a solvent is mixed with the other polymer. However, the method for obtaining a preferably dispersed condition of the polymer alloy is not limited to the methods described above.

Among the methods described above, when a method is used in which master pellets composed of the polymer 2 and the polymer 1 containing the polymer 2 at a high concentration (for example, 35 to 65 wt %, more preferably 40 to 60 wt %) are first prepared when pelletizing is performed and are then further diluted with the polymer 1 for forming a polymer alloy having a predetermined ratio, the dispersion state between the polymers is improved, and as a result, a preferable dispersion state for the polymer alloy of the present invention is obtained.

The film of the present invention may be a monolayer film; however, in particular, when it is used for a magnetic recording medium, a laminated film containing at least two film layers, that is, a base layer portion (hereinafter referred to as "A layer") formed of the film of the present invention and at least a laminated portion (hereinafter referred to as "B layer") laminated thereon, is preferably used. When this laminated film is used as a magnetic recording medium, the A layer is generally the thickest layer among the films and primarily serves to maintain the thickness, dimensional stability, and the like of the film. The B layer used as the laminated portion has a smaller thickness than that of the A layer and primarily serves to maintain tape running properties and running durability when used as a magnetic tape, and when the B layer has a relatively coarse surface, superior running properties may also be obtained.

In the case described above, the type of polymer used for films other than the A layer is not specifically limited;

however, when the same polyester resin as that used for the A layer, or a polymer alloy composed of the same polyester resin (polymer 1) and the same thermoplastic resin (polymer 2) as those used for the A layer is used, a difference in melt viscosity between the base layer portion and the laminated portion does not easily occur, and as a result, it is preferable since problems, such as lamination mottle or scratches caused by extruding die, do not often occur in the production process.

A filler material added to and compounded with the film of the present invention is not specifically limited; however, when the film of the present invention is used as a magnetic recording medium, in order to improve the running durability of the magnetic tape and running properties for a magnetic head, inert particles may be contained in the film. The inert particles described in the present invention are inorganic or organic particles, having an average particle diameter of 1 nm to 3 $\mu$m, which will not occur chemical reaction in the polymers of the present invention or will not adversely influence magnetic recording performance due to the electromagnetic properties of the inert particles. As the inert particles, for example, there may be mentioned inorganic particles, such as titanium oxide, calcium carbonate, kaolin, talc, wet or dry silica, colloidal silica, calcium phosphate, barium sulfate, alumina, or zirconia; organic particles formed of an acrylic acid derivative, styrene, silicone, imide, or the like; particles (so-called internal particles) precipitated by a catalyst or the like which is added in a polyester polymerization step; or surfactant.

When the film of the present invention contains inert particles, the weight average particle diameter and the content thereof vary depending on applications of the film; however, the weight average particle diameter is preferably in the range of 0.001 to 3 $\mu$m. In addition, the content of the particles is preferably in the range of 0.001 to 3 wt %.

When the film of the present invention is an A/B laminated film used for a magnetic recording medium, the weight average particle diameter of inert particles contained in the A Layer is preferably in the range of 0.001 to 0.5 $\mu$m, and is more preferably in the range of 0.01 to 0.3 $\mu$m. When the weight average particle diameter of the inert particles is more than 0.5 $\mu$m, and the film is used for a magnetic recording medium, coarse projection may be easily formed, and as a result, the electromagnetic conversion characteristics may be degraded or the magnetic head may be easily damaged in some cases. When the weight average particle diameter is less than 0.001 $\mu$m, it is not preferable since the effect of improving the running properties for a magnetic head is not significant.

When the film of the present invention is an A/B laminated film used for a magnetic recording medium, the content of inert particles contained in the A layer is preferably in the range of 0.001 to 1 wt %, and is more preferably in the range of 0.02 to 0.05 wt %. When the content of the inert particles is more than 1 wt %, projections become coarse due to particle agglomeration, and as a result, the electromagnetic conversion characteristics may be degraded or the projections may be easily scraped away in some cases. When the content of the inert particles is less than 0.001 wt %, this is not preferable since the effect of improving the running properties for a magnetic head is not significant.

When the film of the present invention is an A/B laminated film used for a magnetic recording medium, in order to improve the handling properties in film-forming and processing steps and to impart running properties and running durability to the film used for the magnetic recording medium, inert particles are added to the B layer. In the step described above, as the inert particles added to the B layer, the inert particles described above may be used. One type of inert particles may be used, and at least two types of inert particles may also be used. The weight average particle diameter Db of the inert particles is preferably in the range of 0.01 to 1 $\mu$m when used for a magnetic recording medium, is more preferably in the range of 0.05 to 1 $\mu$m, and is most preferably in the range of 0.1 to 0.5 $\mu$m. The content thereof is in the range of 0.001 to 3 wt %, is preferably in the range of 0.005 to 1 wt %, and is most preferably-in the range of 0.1 to 1 wt %. When the weight average particle diameter of the inert particles contained in the B layer is more than 1 $\mu$m, and when the film is stored in a state in which the film is being wound, the projections on the B layer side are transferred to the surface opposite thereto, the opposite surface is roughened, and as a result, the electromagnetic conversion characteristics may be degraded in some cases. On the other hand, when the weight average particle diameter is less than 0.01 $\mu$m, the handling properties or the running properties of the magnetic tape may not be sufficiently improved in some cases. In addition, when the content of the inert particles contained in the B layer is more than 3 wt %, similarly as described above, the electromagnetic conversion characteristics may be degraded due to the transfer to the opposite side described above in some cases. Furthermore, when deposition is performed, the cooling efficiency is decreased in a fabrication step, the generation of "wrinkles" or the precipitation of oligomers may occur in some cases. When the content is less than 0.001 wt %, the effect of improving the handling properties and running properties for a magnetic head may not be satisfactory obtained in some cases.

When the film of the present invention is an A/B laminated film used for a magnetic recording medium, the thickness t of the B layer is preferably 0.1 to 10 times the weight average particle diameter Db of the inert particles and is more preferably 0.2 to 5 times. When t/Db is less than 0.1, the inert particles may be easily removed in some cases. On the other hand, when t/Db is more than 10, the heights of projections on the B layer side become irregular, and as a result, the effects of improving the running properties and the handling properties may not be satisfactory obtained in some cases.

In the case in which the film of the present invention is an A/B laminated film used for a magnetic recording medium, when the thickness of the B layer is 20% or less of the entire thickness of the film, it is preferable since superior film-forming properties may be obtained. The thickness of the B layer is more preferably 15% or less of the entire film thickness, and is even more preferably 10% or less. In addition, in the case in which the film is used as a laminated film as described above, when the thickness of the B layer is 0.01 to 5 $\mu$m, it is preferable since even more preferable film-forming properties may be obtained. The thickness of the B layer is preferably in the range of 0.03 to 2 $\mu$m, and is more preferably in the range of 0.05 to 1 $\mu$m.

In the case in which the film of the present invention is used for a magnetic recording medium, when the magnetic recording medium is a metal particles magnetic recording medium, the advantage of the present invention can be satisfactorily obtained even when the film has an A/B laminated structure. In particular, in the case in which the application is a metal evaporated magnetic recording medium, when the film has an easy-slip smooth layer (C layer) which is provided on at least the surface opposite to the B layer of the base film having the A/B laminated structure, or when the film has a laminated portion (D layer), which comprises inert particles and a polyester or a material composed of a polyester and a thermoplastic resin other than a polyester, on the surface opposite to the B layer of the A layer so as to form a three-layered laminate structure composed of the D layer, the A layer, and the B layer in that order, it is preferable since the advantage of the present invention can be satisfactory obtained. However, the present invention is not limited thereto. Even when the film has a three-layered structure, since the B layer must be responsible for running properties of the magnetic tape, inert particles having a relatively large particle diameter must be contained as described above. However, in the case described above, since the C layer or the D layer is responsible for the electromagnetic conversion characteristics as a magnetic tape and for the running properties for a magnetic head, the A layer constituting the base layer portion may be formed into a smooth layer containing substantially no inert particles.

When the film of the present invention has a three-layered structure having the easy-slip smooth layer (C layer), the C layer is formed by coating. The C layer is not specifically limited; however, it is preferable that the C layer be primarily composed of a water-soluble polymer and inert particles. In view of the running properties for a magnetic head and the running durability, the C layer must be provided on at least the surface opposite to the B layer. It is preferable that the C layer be provided since low-molecular weight materials, which are precipitated on the surface coming from the inside of the film, are effectively reduced during a film storage step or during deposition and fabrication steps. In addition, in view of restraining the precipitation of oligomers in a step for forming the magnetic tape or in the storage step, an easy-slip layer (C' layer) may be formed on the surface of the B layer side so as to form a structure composed of the C layer, the A layer, the B layer, and the C' layer in that order. However, the productivity in the case described above is decreased compared to the case in which the C' layer is not provided.

When the C layer is provided on the film of the present invention, as the water-soluble polymer constituting the C layer, a polymer may be used which contains a polar group, such as a hydroxyl group, an ether group, an ester group, a sulfonic group, an amide group, a methoxy group, or a hydroxylpropoxy group, and which has a molecular weight in the range of 10,000 to 2,000,000, and preferably in the range of 100,000 to 1,000,000. In particular, polyvinyl alcohols, tragacanth gum, gum arabic, casein, gelatin, methyl cellulose, hydroxylethyl cellulose, carboxylmethyl cellulose, a water-soluble polyester resin formed of a polyvalent carboxylic acid, such as terephthalic acid, isophthalic acid, or trimellitic acid, and ethylene glycol or the like, or a water-soluble polyester ether copolymer may be used, and in addition, a blend material formed of the materials mentioned above may also be used. Among those mentioned above, a blend material of methyl cellulose and the water-soluble polyester resin is preferably mentioned by way of example since it has superior wettability to the A layer.

When the C layer is provided on the film of the present invention, as the type of inert particles constituting the C layer, the afore-mentioned particles may also be mentioned by way of example. Among the particles, organic particles formed of acrylic acid derivatives, styrene derivatives, silicones, or imides, and in particular, organic particles formed of acrylic acid derivatives or imides are preferably used since coating irregularity is unlikely to occur, and removal of particles and damage on the surface of the film in film-forming and fabrication steps can be significantly decreased. The reason for this is believed that the organic particles described above has superior affinity to the A layer primarily composed of polyester and polyimide.

When the C layer is provided on the film of the present invention, the weight average particle diameter Dc of inert particles constituting the C layer is preferably 5 to 50 nm, is more preferably 6 to 25 nm, and is most preferably 7 to 20 nm. Since the C layer is formed by coating, when the weight average particle diameter is more than 50 nm, the particles may easily be removed in film-forming and fabrication steps in some cases. On the other hand, when the weight average particle diameter is less than 5 nm, the inert particles are easily agglomerated when the coating solution is prepared, and as a result, coarse projections may be formed or the particles may easily be removed in film-forming and fabrication steps in some cases.

When the C layer is provided on the film of the present invention, the content of inert particles constituting the C layer is 3,000,000 to 70,000,000/mm$^2$, and is more preferably 5,000,000 to 50,000,000/mm$^2$. The reason the content of particles in the C layer is represented by the number of particles per nit area is that since the C layer is extremely thin compared to the average particle diameter of the particles, the most particles contained in the C layer are exposed on the surface of the C layer. When the content is represented by the ratio to a water-soluble polymer, the content is preferably 5 to 50 parts by weight to 100 parts by weight of the water-soluble polymer (to 100 parts by weight of the total of the water-soluble polymer and the coupling agent when a silane coupling agent or a titanium coupling agent is contained in the C layer), and is more preferably 10 to 40 parts by weight. When the content of the particles is in the range described above, the particles contained in the C layer will not removed, and the electromagnetic conversion characteristics are also improved.

When the C layer is provided on the film of the present invention, the coating thickness of the C layer is not specifically limited: however, the film of the present invention is effectively obtained when the thickness of the C layer is in the range of 1 to 50 nm and is preferably in the range of 5 to 25 nm. When the thickness of the C layer is less than 1 nm, the coating amount per unit area is extremely small, and hence, it becomes difficult to perform stable coating. On the other hand, when the thickness is more than 50 nm, since drying of a coating solution may not be well performed during in-line steps, or the C layer may be cracked in a stretching step, the C layer may be easily separated from the film in some cases.

In the case in which the film of the present invention is a three-layered film composed of the D layer, the A layer, and the B layer in that order, when the polymer used for the D layer is the same polyester resin as that forming the A layer or is a polymer alloy formed of the same polyester resin and thermoplastic resin as those forming the polymer alloy for the A layer, it is preferable since problems, such as lamination mottle or stretches caused by extruding die, are not likely to occur in a film-forming process. Above all, when only a polyester resin is used for the D layer, a polyester resin having a higher molecular weight than that of the polyester forming the A layer is preferably used. In addition, when a polymer alloy composed of a polyester resin and a polyimide resin is used for the D layer, the polyester and the polyimide reins preferably have the same molecular weights of the corresponding polymers forming the A layer, and the content of the polyimide resin is also preferably equivalent to that forming the A layer. Consequently, the problems occurs in a film-forming step can be reduced.

In the case in which the film of the present invention is a three-layered film composed of the D layer, the A layer, and the B layer in that order, when the polymer used for the D layer is a polyester resin containing ethylene terephthalate as a primary component, this polyester resin may be formed by a polymerization method using carboxylic acids or by a polymerization method using carboxylic acid esters; however, when the polymerization method using carboxylic acid esters is used, calcium acetate is preferably used as an ester exchange catalyst. In addition, in a polymerization step, the catalyst is not specifically limited; however, a germanium compound is preferably used as a polymerization catalyst since the formation of the coarse projections caused by foreign materials can be suppressed. As the germanium catalyst, as well known, (1) amorphous germanium oxide, (2) crystal germanium oxide 5 μm or less in diameter, (3) a solution composed of germanium oxide dissolved in glycol in the presence of an alkali metal or an alkaline earth metal, and (4) a glycol solution, containing germanium oxide, which is prepared by steps of dissolving germanium oxide in water, adding glycol thereto, and removing water by distillation, may be used.

In the case in which the film of the present invention is a three-layered film composed of the D layer, the A layer, and the B layer in that order, as the type of inert particles contained in the D layer, for example, there may be mentioned the particles described above. Among the above particles, colloidal silica, finely dispersed alumina, and organic particles primarily composed of a styrene resin, a silicone resin, a polyimide resin, or the like may be preferably mentioned by way of example.

In the case in which the film of the present invention is a three-layered film composed of the D layer, the A layer, and the B layer in that order, the weight average particle diameter Dd of inert particles contained in the D layer is preferably 10 to 50 nm, is more preferably 15 to 50 nm, and is most preferably 20 to 40 nm. When the weight average particle diameter is more than 50 nm, since projections at the magnetic surface side are too coarse used as a magnetic tape having a deposited magnetic layer, the electromagnetic conversion characteristics may be degraded, the magnetic head may be damaged, and the running durability may also be degraded in some cases. When the weight average particle diameter is less than 20 nm, since the heights of projections at the magnetic surface side are small, the friction with the magnetic head is too much increased, the running properties for the head may be degraded, or the film may be easily damaged in some cases by the friction with the rollers in film-forming and fabrication steps.

In the case in which the film of the present invention is a three-layered film composed of the D layer, the A layer, and the B layer in that order, the content of the inert particles contained in the D layer is preferably 0.1 to 3 wt %, is more preferably 0.3 to 1.5 wt %, and is most preferably 0.5 to 1 wt %. When the content is more than 3 wt %, projection become coarse since particles agglomerate in a melt molding step, the electromagnetic conversion characteristics may be degraded, or the projections may be easily scraped away in some cases. When the content is less than 0.1 wt %, the magnetic surface becomes too flat, the running properties for a head may be degraded, or the film may be easily damaged in some cases by the friction with the roller in film-forming and fabrication steps.

In the case in which the film of the present invention is a three-layered film composed of the D layer, the A layer, and the B layer in that order, the thickness $t_D$ of the D layer is preferably 0.01 t 0.8 μm, is more preferably 0.03 to 0.5 μm, and is even more preferably 0.05 to 0.1 μm. When the thickness of the D layer is less than 0.01 μm, the particles contained in the D layer are easily removed, and as a result, the running durability may be degraded in some cases. On the other hand, when the thickness is more than 0.5 μm, the heights of the projections become irregular, and the running properties for a head may be degraded in some cases. In addition, the thickness $t_D$ of the D layer is preferably 0.1 to 10 times the weight average particle diameter of the particles contained in the D layer, and is more preferably 0.5 to 5 times. When the thickness $t_D$ of the D layer is 0.5 to 5 times, the electromagnetic conversion characteristics and the running properties for a head are both superior.

In the case-in which the film of the present invention is a three-layered film composed of the D layer, the A layer, and the B layer in that order, it is preferable that a surfactant or wax such as aliphatic esters be contained in individual films since the precipitation of low molecular weight materials, which is contained in the films, on the surfaces thereof can be effectively suppressed. When the surfactant or wax is contained in the B and the D layers at a high concentration and is contained in the A layer at a low concentration or is not substantially contained therein, it is more preferable since a decrease in modulus and the like is not likely to occur. As the wax, natural wax such as carnauba wax, or a fatty acid ester such as stearyl stearate or behenyl behenate may be mentioned, and in particular, carnauba wax is preferably mentioned by way of example. As the surfactant, there may be mentioned an alkali metal salt or an alkaline earth metal salt of alkyl sulfonic acid such as undecyl sodium sulfonate or dodecyl potassium sulfonate; or an alkali metal salt or an alkaline earth metal salt of alkylbenzene sulfonic acid such as dodecylbenzene sodium sulfonate or dodecylbenzene lithium sulfonate. Among those, dodecylbenzene sodium sulfonate may be preferably mentioned by way of example. The content is preferably 0.1 to 2 wt %, and is more preferably 0.2 to 0.8 wt %.

In view of-the electromagnetic conversion characteristics and dropout, the number H1 of coarse projections on the surface of the film of the present invention is $100/cm^2$ or less, is preferably $50/cm^2$ or less, and is even more preferably $10/cm^2$ or less. Similarly to the above, in view of the running durability, the number H2 of coarse projections is $10/cm^2$ or less, is preferably $5/cm^2$ or less, and is even more preferably 2/cm or less. In addition, when the numbers H1 and H2 of the coarse projections are out of the ranges described above, respectively, it is not preferable since the projections are likely to be removed by contact with rollers during transportation in film-forming and fabrication steps, and the removed projections damage the film. When the film is used for a magnetic recording medium, it is not preferable since the coarse projections may damage a magnetic head or may cause the dropouts. In addition, the coarse projections may be scraped away while the tape is running, thereby causing driving operation failures.

When the film of the present invention is used as a laminated film, the numbers H1 and H2 of coarse projections on the surface opposite to the B layer must satisfy the ranges described above.

When the film of the present invention having a laminated structure is used for a metal particles magnetic recording medium, the surface roughness Ra(b) of the surface (b surface) at the B layer side is preferably 3 to 15 nm, is more preferably 5 to 12 nm, and is most preferably 7 to 10 nm. When the Ra(b) is less than 3 nm, it is not preferable since the productivity is decreased due to inferior handling properties obtained in film-forming and fabrication steps, or since the sufficient magnetic tape properties are not obtained due to the degradation of the running properties and of the abrasion resistance when the film is used for a magnetic tape. When Ra (b) is more than 15 nm, and the film is used for a magnetic tape, it is not preferable since the particles on the running surface side may be easily removed so as to cause the dropouts or to cause the degradation of the running properties.

When the film of the present invention having a laminated structure is used for a metal particles magnetic recording medium, the surface roughness Ra(f) of a surface (f surface) opposite to the B layer is preferably 0.5 to 10 nm, is more preferably 1 to 8 nm, and is most preferably 1.5 to 6.5 nm. When the Ra(f) is less than 0.5 nm, it is not preferable since the sufficient magnetic tape properties are not obtained due to the degradation of the running properties for a magnetic head when the film is used for a magnetic tape. When the Ra(f) is more than 10 nm, it is not preferable since the electromagnetic conversion characteristics are degraded, or the magnetic head is easily damaged when the film is used for a magnetic tape.

When the film of the present invention having a laminated structure is used for a metal particles magnetic recording medium, the difference, Ra(b)–Ra(f), in surface roughness between the front side and the rear side of the film is 1 to 7 nm, and the surface roughness at the B layer side is larger. The difference is preferably 2 to 5 nm. When the Ra(b)–Ra (f) is more than 7 nm, the surface of the B layer side that is relatively coarse is transferred to the smooth surface opposite to the B layer. Accordingly, it is not preferable since the magnetic surface becomes coarse when the film is used for a magnetic tape, and the electromagnetic conversion characteristics are degraded. In addition, when the Ra(b)–Ra(f) is less than 1 nm, it is not preferable since the handling properties are degraded in film-forming and fabrication steps, and it becomes difficult to wind the film so as to form a roller shape.

When the film of the present invention having a laminated structure is used for a metal evaporated magnetic recording medium, the surface roughness Ra(b) of the surface (b surface) at the B layer side is 5 to 20 nm, is preferably 6 to 17 nm, and is even more preferably 7 to 15 nm. When Ra(b) is less than 5 nm, it is not preferable since the productivity is decreased due to insufficient handling properties obtained in film-forming and fabrication steps, or since the sufficient magnetic tape properties are not obtained due to degradation of the running properties and or the abrasion resistance when the film is used for a magnetic tape. When Ra(b) is more than 20 nm, and the film is used as a magnetic tape, it is not preferable since the electromagnetic conversion characteristics are degraded due to the transfer of a running surface state to a magnetic surface, or since the particles on the running surface side are easily removed so as to degrade the running properties and to cause the dropouts. In addition, when the magnetic tape has a deposited magnetic layer, since the cooling efficiency in a deposition step is decreased, thermal degradation such as "wrinkle" may occur, or oligomers are easily precipitated.

When the film of the present invention having a laminated structure is used for a metal evaporated magnetic recording medium, the surface roughness Ra(f) on the surface opposite to the B layer is 0.1 to 5 nm, is preferably 1 to 4 nm, and is even more preferably 1.5 to 3 nm. When Ra(f) is less than 0.1 nm, it may be difficult to commercially manufacture the film, or sufficient magnetic tape properties may not be obtained in some cases since the running properties for a magnetic heads is degraded when the film is used for a magnetic tape. When Ra(f) is more than 5 nm, and the film is used as a magnetic tape having a deposited magnetic layer, it is not preferable since the electromagnetic conversion characteristics are degraded or the magnetic head is easily damaged.

The ratio of the actual average particle diameter Dv in the film (in the A layer in the case of a laminated structure) of the present invention to the weight average particle diameter D of the inert particles is preferably 1 to 3, is more preferably 1 to 2, and is most preferably 1 to 1.5. The actual average particle diameter is the size including voids formed around one particle in the film. In the polymer alloy of the present invention, voids tend to be easily formed around the particles since it is believed that the affinity of the polymer alloy to the particle is low due to higher melt viscosity compared to polyester such as poly(ethylene terephthalate). When the size of a void formed around the particle is large, the particles are easily removed in film-forming and fabrication steps and in a running stage when the film is used as a magnetic tape, and as a result, the magnetic tape properties are degraded. In addition, the projections become flat, the contact area with a magnetic head is increased, and hence, the running properties for a magnetic head are degraded. As described above, when Dv/D is more than 3, it is not preferable since the particles are easily removed or the running properties for a magnetic head is degraded.

The content of the polymer 2 in the film (in the A layer in the case of a laminated structure) according to the present invention is preferably in the range of 1 to 30 wt % of the polymer alloy, is more preferably in the range of 5 to 30 wt %, and is most preferably in the range of 8 to 15 wt %. In general, since the melt viscosities of the polymer 1 and the polymer 2 are largely different from each other, when the content of the polymer 2 is less than 1 wt %, it may be difficult to obtain a finely dispersed state between the two polymers by using an extruder in some cases, domains containing the polymer 2 at a high concentration become coarse, and as a result, projections formed on the surface may become coarse in some cases. In addition, when the content of the polymer 2 is more than 30 wt %, since it may be difficult to perform extrusion molding and draw processing of the polymer alloy, a problem such as film breakage or scratches caused by extruding dies in film-forming and fabrication steps may arise, or a problem of the formation of coarse projections may arise since voids formed around the particles become larger.

The film of the present invention may contain a thermal stabilizer, an antioxidant, a UV absorber, an antistatic agent, a flame retardant, a pigment, a dye, a fatty acid ester, or an organic lubricant such as wax as long as the advantage of the present invention can be maintained.

The extrapolated glass transition-starting temperature ($Tg_{onset}$) of the polymer in the film (the A layer in the case of a laminated structure) according to the present invention is not specifically limited; however, it is preferably 90 to 150° C., is more preferably 95 to 130° C., and is even more preferably 98 to 120° C. When the $Tg_{onset}$ is below 90° C., the heat dimensional stability is degraded, and when the film is used for a magnetic recording medium, "track deviation" may occur in some cases. In addition, when the $Tg_{onset}$ is above 150° C., it may be difficult to perform melt molding or melt film formation in some cases.

In the view of the film-forming stability and the compatibility with a thermoplastic resin, the intrinsic viscosity of the polymer alloy forming the film (the A layer in the case of a laminated structure) according to the present invention is preferably in the range of 0.55 to 3.0 (dl/g), and is more preferably in the range of 0.60 to 2.0 (dl/g). In addition, in view of the film-forming stability and the dimensional stability, the intrinsic viscosity of the film obtained by a film formation step is preferably in the range of 0.50 to 2.0 (dl/g), and is more preferably in the range of 0.55 to 1.0 (dl/g).

Preferable Young's moduli of the film of the present invention in the longitudinal direction and the width direction considerably vary depending on film applications, and for example, when the film is used for a magnetic recording medium, the sum of the Young's moduli of the film in the longitudinal direction and in the width direction is preferably in the range of 9 to 25 GPa.

However, among the magnetic recording media, when the film is used for a linear recording data tape for data storage application, the sum of the Young's moduli in the longitudinal direction and in the width direction is preferably in the range of 10 to 25 GPa, is more preferably in the range of 10 to 22 GPa, and is even more preferably in the range of 14 to 20 GPa. When the sum of the Young's modulus is less than 10 GPa, and when the film is used for, for example, a magnetic recording medium, the magnetic tape will be easily elongated or deformed, or the electromagnetic conversion characteristics are adversely influenced due to a tension imparted to the film from a running magnetic head or a guide pin, and as a result, the magnetic tape may not be used in practice in some cases. In addition, when the sum of the Young's modulus is more than 25 GPa, it may be difficult to commercially manufacture the film, or the tearing strength or the dimensional stability of the film may be considerably degraded in some cases. The Young's modulus of the film in the longitudinal direction is preferably 5.5 GPa or more, and is more preferably 6 GPa or more. When the Young's modulus in the longitudinal direction is less than 5.5 GPa, and when the film is used for a magnetic tape, the contacting condition with a magnetic head is not good enough, the electromagnetic conversion characteristics may be adversely influenced, and as a result, the film may not be used in practice in some cases.

In addition, among magnetic recording media, when the film is used for a helical scanning video tape such as a digital video tape, the sum of the Young's moduli in the longitudinal direction and in the width direction is preferably in the range of 9 to 20 GPa, is more preferably in the range of 10 to 18 GPa, and is even more preferably in the range of 11 to 15 GPa. In view of the contacting condition with a magnetic head, the Young's modulus in the longitudinal direction is preferably 4.3 GPa or more, is more preferably 4.5 GPa or more, and is most preferably 5.0 GPa or more. In addition, in view of reducing the tape edge damage or elongation in the longitudinal direction, the Young's modulus in the width direction is preferably 4.7 GPa or more, is more preferably 5 GPa, and is most preferably 5.5 GPa or more.

Preferable heat shrinkage of the film of the present invention considerably varies depending on film applications, and for example, when the film is used for a magnetic recording medium, in view of the elongation properties and the storage stability of the tape, the heat shrinkage of the film in the longitudinal direction at 100° C. for 30 minutes is preferably 1.2% or less, and is more preferably 1% or less. When the heat shrinkage is more than 1.2%, the dimensional stability may be degraded in some cases. For example, in the application of a magnetic recording medium, the heat distortion of the tape, the degradation of durability of film surface, or the degradation of storage stability of the tape may occur in some cases by heat history during film fabrication steps in which a magnetic layer is applied to the base film and the like, or by an increase in temperature caused by friction between the magnetic recording head and the magnetic tape running thereon.

In view of the elongation properties and the storage stability of the tape, the heat shrinkage of the film of the present invention in the longitudinal direction at 80° C. for 30 minutes is preferably 0.3% or less, and is more preferably 0.25% or less.

In view of the elongation properties and the storage stability of the tape, the heat shrinkage of the film of the present invention in the width direction at 100° C. for 30 minutes is preferably 0.5% or less, and is more preferably 0.3% or less. When the heat shrinkage is more than 0.5%, the dimensional-stability may be degraded in some cases. For example, in the application of a magnetic recording medium, the heat distortion of the tape, the degradation of durability of film surface, or the degradation of storage stability of the tape may occur in some cases by heat history during film fabrication steps in which a magnetic layer is applied to the base film and the like, or by an increase in temperature caused by friction between the magnetic recording head and the magnetic tape running thereon.

In view of the elongation properties and the storage stability of the tape, the heat shrinkage of the film of the present invention in the width direction at 80° C. for 30 minutes is preferably 0.1% or less, and is more preferably 0.05% or less.

When the film of the present invention is held under the conditions of a temperature of 60° C. and a relative humidity of 80% for 72 hours while being subjected to a load of 26 MPa in the longitudinal direction, the rate of change in the dimensions of the film in the width direction is preferably −0.4 to 0% in view of the elongation properties of the tape, and is more preferably −0.3 to 0%. When the rate of change in the dimensions is out of the range described above, and when the tape is used for a magnetic tape, the track deviation may easily occur in some cases.

The application of the film of the present invention is not specifically limited, and the film of the present invention may be used for base films of a magnetic recording medium, capacitors, heat sensitive transfer ribbons, heat sensitive printing plates, optical materials, or the like. Among those mentioned above, the film of the present invention may be preferably applied to a base film for data storage or a magnetic recording medium, such as a digital video tape, having a deposited magnetic layer, in which uniform and fine surface shapes and high dimensional stability are required. In particular, the film of the present invention may be most preferably applied to a base film for data storage which performs high density magnetic recording. The data recording capacity of the data storage is preferably 30 gigabytes (GB) or more, is more preferably 70 GB or more, and is even more preferably 100 GB or more.

The thickness of the film of the present invention is optionally determined according to various applications. For example, in general, a thickness of 1 to 15 µm is preferably applied to the application of a magnetic recording medium; a thickness of 0.5 to 15 µm is applied to the application of a capacitor in view of superior insulating breakdown voltage, stability of dielectric properties, and the like; a thickness of 1 to 6 µm is preferably applied to the application of heat sensitive ribbons in order to prevent the generation of "wrinkles", printing irregularity, and excessive ink transfer during a printing step; and a thickness of 0.5 to 5 µm is preferably applied to the application of a heat sensitive stencil film in view of punching properties and printability.

In particular, in the application of a high-density magnetic recording medium, the thickness is preferably 3 to 8 µm, is more preferably 4 to 7 µm, and is most preferably 4.5 to 6.5 µm. When the thickness is less than 3 µm, the tape may loose its stiffness, and hence, the electromagnetic conversion characteristics may be degraded in some cases. When the thickness is more than 8 µm, the tape length in one cassette becomes shorter, and hence, it may be difficult to achieve the miniaturization and higher capacity of a magnetic tape in some cases.

The film of the present invention may be directly laminated to another polymer layer, such as a polyolefin, a polyamide, a polyvinylidene chloride, or an acrylic resin, or may be indirectly laminated thereto with an adhesive provided therebetween.

When necessary, the film of the present invention may be optionally processed by, for example, heat treatment, molding, surface treatment, laminating, coating, printing, embossing, or etching.

In addition, when a magnetic layer is provided on at least one surface of the film of the present invention, a magnetic recording medium may be formed. The magnetic layer may be provided on one optional surface or on both surfaces of the film; however, when the film having the laminated structure described above is used, the magnetic layer may be preferably provided on the surface (f surface side) opposite to the B layer.

As the magnetic layer, a ferromagnetic metal thin-film, a magnetic layer composed of ferromagnetic metal fine powder dispersed in a binder, or a magnetic layer formed by applying a metal oxide may be mentioned as a preferable example. As the metal for use in the ferromagnetic metal thin-film, iron, cobalt, nickel, or the alloy thereof is preferably mentioned. As the ferromagnetic metal fine powder dispersed in the binder for forming the magnetic layer, ferromagnetic hexagonal ferrite fine powder, powdered iron, cobalt, nickel, or powdered alloy thereof may be preferably used. As the binder mentioned above, a thermoplastic resin, a thermosetting resin, a reaction type resin, or the mixture thereof may be preferably used.

As a method for forming the magnetic layer, there may be mentioned a coating method for compounding a powdered magnetic material with binder composed of a thermosetting, thermoplastic, or a radiation curable resin, followed by coating and drying; and a dry method for directly forming a thin magnetic layer composed of a metal or an alloy on a base film by deposition, sputtering, ion plating, or the like.

In the magnetic recording medium of the present invention, a protective film may be provided on the magnetic layer. By this protective film, the running properties and the corrosion resistance can be further improved. As the protective film, there may be mentioned an oxide protective film composed of, for example, silica, alumina, titania, zirconia, cobalt oxide, or nickel oxide; a nitride protective film composed of, for example, titanium nitride, silicon nitride, or boron nitride; a carbide protective film composed of, for example, silicon carbide, chromium carbide, or boron carbide; or carbon-based protective film composed of carbon such as graphite or amorphous carbon.

The carbon-based protective film described above is a carbon film having an amorphous, s graphite, s diamond structure, or the mixture thereof, which are produced by plasma CVD, sputtering, or the like, and among those mentioned above, a hard carbon film which is generally called diamond-like carbon is particularly preferable.

In addition, in order to improve the adhesion between this hard carbon protective film and a lubricant provided thereon, the surface of the hard carbon protective film may be treated by plasma using an oxidizing gas or an inert gas.

In the present invention, in order to improve the running durability and the corrosion resistance of a magnetic recording medium, on the magnetic layer or the protective film, a lubricant or an antirust may be preferably provided.

A method for manufacturing the polyester film of the present invention will be described; however, the present invention is not limited thereto.

It is preferable that a polymer alloy composed of the polymer 1 and the polymer 2 be first melt-extruded from a extruding die by using an extruder, the molten polymer alloy be solidified by cooling to form a sheet, and subsequently, biaxial stretching and heat fixing be performed therefor.

A preferable method for manufacturing the polymer alloy described above is a method for mixing pellets of the polymer 1 and master pellets composed of the polymer 1 and the polymer 2. In general, since the melt viscosities of the individual pellets of the polymer 1 and the polymer 2 are significantly different from each other, when they are directly mixed by using an extruder, coarsely dispersed materials are easily formed by insufficient compounding, resulting in the formation of coarse projections on a film finally obtained.

As a method for manufacturing the master pellets of the polymer 1 and the polymer 2, for example, there may be preferably mentioned a method for melting and compounding the individual pellets of the polymer 1 and the polymer 2 by using an extruder and a method in which when the polymer 1 is formed by polymerization, a starting material for the polymer 2 is copolymerized therewith. In the case described above, poor dispersion state between the polymer 1 and the polymer 2 may not occur when the copolymerization is performed; however, the crystallinity of the final film may be decreased, and as a result, the film strength may be decreased in some cases.

When the master pellets are formed by melt compounding the pellets of the polymer 1 and the polymer 2 by using an extruder, the content of the polymer 2 is preferably 35 to 65 wt %, and is more preferably 40 to 60 wt %. When the content of the polymer 2 is out of the range described above, coarse domains may be formed in the polymer due to the phase separation or the poor dispersion. As the extruder for melting and compounding the polymers, a vented biaxial extruder is preferably mentioned by way of example in view of the compounding performance. In addition, the residence time is preferably 30 to 600 seconds, is more preferably 60 to 300 seconds, and is most preferably 180 to 300 seconds. When the residence time is less than 30 seconds, coarse dispersed materials may be formed in some cases since sufficient compounding is not performed. When the residence time is more than 600 seconds, the polymers are treated at a melting temperature for a long time, thermally degraded materials are formed, and when the film is then formed, coarse projections may be formed in some cases. In the case in which pellets composed of a polymer alloy are formed, compared to a step of manufacturing a typical single polyester film, since coarse materials which are not well dispersed are easily formed and contaminants are also easily contained, the formation of coarse projections on a final film can be effectively reduced by performing filtration to remove coarse dispersed materials and the contaminants during a melt compounding step. In the case described above, a filter formed of a sintered metal, a porous ceramic, sand, a woven metal, and the like may be preferably used. Among those mentioned above, a sand filter and a fiber sintered stainless steel filter having a cut of 5 to 20 µm are preferably mentioned by way of example. When a filter having a cut of 5 µm or less is used in a melt compounding step, filter clogging may occur, so that the productivity is significantly decreased. In addition, when a filter having a cut of 20 μm or more is used, since coarse foreign materials are contained in a subsequent film-forming step by extrusion, the lifetime of filter becomes short in a filtration step performed before the film-formation, and the productivity may be decreased in some cases.

The filter having a cut of 5 μm means a filtration accuracy of 5 μm, and the filtration accuracy means the maximum particle diameter of a glass bead passing through a filter medium in accordance with a method specified by JIS-B8356.

When the master pellets formed by melt compounding as described above is observed by a transmission electron microscope at a magnification of 30,000 to 500,000, and when the structures (for example, polymer domains) which are not caused by an additive such as externally added particles are controlled so that the diameter of the structure is 500 nm or less, it is preferable since the polymers are easily dispersed with each other in a subsequent diluting step. When structures having a diameter of 500 nm or more exist, the polymers are not well dispersed with each other in the diluting step, and coarse projections may be formed on the film in some cases.

In the method for manufacturing the film according to the present invention, when the polymer alloy is formed by melt extruding the polymer 1 and the polymer 2 in an extruder and is then extruded from a extruding die, in order to remove foreign materials, degraded polymers, non-molten materials, and the like, it is preferable to use various filters composed of, for example, a sintered metal, a porous ceramic, sand, or a woven metal, for performing filtration. In particular, for example, the A layer in the case of a laminated film and a polymer at the outermost layer opposite to the B layer in the case of a three-layered film are preferably filtrated using a fiber sintered stainless steel filter having a cut of 1.2 μm or less. More preferably, a filter having a cut of 0.8 μm or less may be used. In addition, if necessary, it is preferable that the polymer be filtrated by using at least two filters, that is, the filtration be performed at least two times, since non-molten materials can be more effectively removed. Most preferably, a sand filter, a fiber sintered stainless steel filter having a cur of 1.2 μm, and a fiber sintered stainless steel filter having a cur of 0.8 μm are used in that order so as to perform three-stage filtration. In the process for manufacturing the polymer alloy according to the present invention, compared to a process for forming a typical single polyester film, since coarse projections are easily formed by the contamination and the coarsely dispersed materials in a compounding step and the like, the method described above in which the filtration is repeatedly performed is a method for effectively decreasing the coarse projections.

In addition, when necessary, a gear pump may be provided for improving the supply stability.

The film of the present invention is formed by steps of solidifying a molten polymer extruded from the extruding die described above by cooling so as to form a sheet, biaxially stretching the sheet in the longitudinal direction and in the width direction, and performing heat treatment. In the steps described above, the stretching may be performed once in each direction described above, respectively. However, when the stretching is performed at least two times in each direction, it is preferable since the dimensional stability is increased, and the film thus obtained is preferably used for a magnetic recording medium. In addition, when re-stretching is performed in the longitudinal direction and in the width direction, the dimensional stability is significantly improved, and hence, the film thus obtained is particularly preferable for a magnetic recording medium.

When the film of the present invention is formed, the total stretching ratio in the longitudinal direction is not specifically limited: however, in general, the stretching ratio is preferably 3 to 8, and is more preferably 4.5 to 6. When the total stretching ratio in the longitudinal direction is less than 3, the modulus in the longitudinal direction is decreased, and hence, the electromagnetic conversion characteristics may be degraded in some cases. When the stretching ratio in the longitudinal direction is more than 8, the voids around the particles become larger, the number of coarse projections becomes large, and as a result, the running properties for a magnetic head may be degraded in some cases when the film is used for a magnetic tape. In the case in which the re-stretching ratio in the longitudinal direction is set to 25% or less of the total stretching ratio, it is preferable since the advantage of the present invention may be easily obtained. When the re-stretching is performed, the stretching ratio in a first stage is preferably 2.5 to 4.0, and the re-stretching ratio in a second stage is preferably 1.2 to 1.8.

When the film of the present invention is formed, the total stretching ratio in the width direction is not specifically limited: however, in general, the ratio is preferably 3 to 8, and is more preferably 3.5 to 6. When the total stretching ratio in the width direction is less than 3, the number of coarse projections becomes large, and as a result, the running properties for a magnetic head may be degraded or the track deviation may easily occur in some cases when the film is used for a magnetic tape. When the stretching ratio in the width direction is more than 6, the productivity may be decreased in some cases due to film breakage. In the case in which the re-stretching ratio in the width direction is set to 20% or less of the total stretching ratio, it is preferable since the advantage of the present invention may be easily obtained. When the re-stretching is performed in the width direction, the stretching ratio in a first stage is preferably 3.0 to 4.5, and the re-stretching ratio in a second stage is preferably 1.2 to 2.

When the film of the present invention is formed, the stretching temperature in the longitudinal direction is not specifically limited: however, when the stretching is performed at a temperature in the range of from (Tg+10° C.) to (Tg+30° C.), in which Tg is a glass transition temperature of a polymer alloy forming the film (A layer in the case of a laminated structure), it is preferable since the stretching property of the polymer alloy becomes superior and the voids are not easily formed. In addition, when the re-stretching is performed in the longitudinal direction, the temperature therefor is preferably in the range of from (Tg+30° C.) to (Tg+50° C.).

When the film of the present invention is formed, the stretching temperature in the width direction is not specifically limited: however, when the stretching is performed at a temperature in the range of from (Tg+10° C.) to (Tg+50° C.), in which Tg is a glass transition temperature of a polymer alloy forming the film (A layer in the case of a laminated structure), it is preferable since the formation of voids can be suppressed in the width direction when the stretching is performed in the width direction. In addition, when the re-stretching is performed in the width direction, the temperature therefor is preferably in the range of from (Tg+80° C.) to (Tg+110° C.).

When the film of the present invention is formed, the stretching rate in the longitudinal direction is not specifically limited: however, when the stretching is performed at a rate in the range of 50,000 to 200,000%/minute, it is preferable since the stretching property of the polymer alloy becomes superior and the voids are not easily formed. The re-stretching rate in the longitudinal direction is preferably in the range of 70,000 to 200,000%/minute.

When the film of the present invention is formed, the stretching rate in the width direction is not specifically limited: however, when the stretching is performed at a rate in the range of 2,000 to 10,000%/minute, it is preferable since the stretching property of the polymer alloy becomes superior and the voids are not easily formed. The re-stretching rate in the width direction is preferably in the range of 5,000 to 20,000%/minute.

The heat treatment for forming the film of the present invention is preferably performed at a temperature in the range of from (Tg+100° C.) to (Tg+125° C.) for 0.2 to 10 seconds since the advantages of the present invention can be obtained.

As a stretching method for stretching the film of the present invention, for example, there may be mentioned a sequential biaxial stretching method in which stretching is first performed in the longitudinal direction and is then performed in the width direction; a simultaneous biaxial stretching method in which stretching is simultaneously performed in the longitudinal and the width directions by using a simultaneous biaxial tenter or the like; and a method having both features of the sequential biaxial stretching method and the simultaneous biaxial stretching method. In particular, a method in which final stretching is performed in the width direction may be mentioned as a preferable method by way of example since the voids are not easily formed in the longitudinal direction.

Hereinafter, concerning the method for manufacturing the polyester film according to the present invention, the most preferable embodiment will be described. An A/B laminated polyester film will be described by way of example, in which the A layer is composed of poly(ethylene terephthalate) as the polymer 1 and poly(ether imide) "Ultem" as the polymer 2. The manufacturing conditions vary depending on a polyester resin and a polyimide resin to be used and on the laminated structure to be formed.

First, by esterifying terephthalic acid and ethylene glycol, or by performing an ester exchange reaction of dimethyl terephthalate and ethylene glycol by a known method, bis-β-hydroxylethyl terephthalate (BHT) is formed. Next, this BHT is transferred to a polymerization chamber, and a polymerization reaction proceeds at 280° C. under vacuum conditions. By the step described above, a polyester resin having an intrinsic viscosity of approximately 0.5 is obtained. The polyester resin thus formed is pelletized and placed in a vacuum for performing solid phase polymerization. When solid phase polymerization is performed, the polyester in pellet form is pre-crystallized at 180° C. or less beforehand, and solid phase polymerization is then carried out at a reduced pressure of approximately 1 mm Hg and at 190 to 250° C. for 10 to 50 hours. In addition, when inert particles are added to the polyester resin forming the film, it is preferable that the inert particles are dispersed in ethylene glycol at a predetermined ratio so as to form a slurry, and this slurry be added to the chamber in which the polymerization is carried out. In the case in which inert particles are added, for example, when water-sol or alcohol-sol obtained when inert particles are synthesized is added without drying, superior dispersibility of the particles can be obtained. In addition, a method in which water slurry containing inert particles is directly mixed with polyester pellets and is then compounded therewith by using a vented biaxial extruder is also an effective method. As an effective method for adjusting the content of inert particles, there may be mentioned a method in which a master batch containing inert particles at a high concentration is formed by the method described above and is diluted in a film-forming step with a polyester resin which does not substantially contain inert particles so as to adjust the content of the inert particles.

Next, pellets of the poly(ethylene terephthalate) and pellets of poly(ether imide) are mixed together at a predetermined ratio, are supplied to a vented biaxial extruder at a temperature of 270 to 300° C., and are then melt-extruded. In the step described above, the residence time is preferably 0.5 to 10 minutes and is more preferably 1 to 5 minutes. In addition, when both polymers are not sufficiently mixed with each other under the conditions described above, chips thus obtained may be repeatedly supplied to the biaxial extruder until both polymers are well mixed together with each other.

After the pellets of the polyester containing poly(ether imide) are dried in a vacuum at 180° C. for 3 hours and are then supplied to an extruder at a temperature of 280 to 320° C. in a nitrogen stream or a vacuum atmosphere so that the intrinsic viscosity is not decreased, the pellets are melt-extruded through a slit-shaped die, and an unstretched film is obtained by cooling the extruded polymer on a casting roller. In the step described above, in order to remove foreign materials or degraded polymers, it is preferable to use various filters composed of, for example, a sintered metal, a porous ceramic, sand, or a woven metal, for performing filtration. In particular, it is preferable that a sand filter, a fiber sintered stainless steel filter having a cur of 1.2 μm, and a fiber sintered stainless steel filter having a cur of 0.8 μm be used in that order so as to perform three-stage filtration. In addition, when necessary, a gear pump may be provided for improving the supply stability. Furthermore, when films are laminated to each other, a method for melt laminating different polymers by using at least two extruders and a manifold or a confluent block may be preferably used.

Next, this unstretched film is biaxially stretched to form a biaxially oriented film. As a method for stretching, a subsequent biaxial stretching method or a simultaneous biaxial stretching method may be used. In this embodiment, a subsequent biaxial stretching method is used in which stretching is first performed in the longitudinal direction and is then performed in the width direction. A stretching temperature varies depending on constituent components forming a laminate, and the case in which the film has a two-layered structure of an A layer and a B layer each of which is a mixed polymer of poly(ethylene terephthalate) and poly(ether imide) (mixing ratio by weight is 9 to 1) will be described by way of example. An unstretched film is heated to 70 to 170° C. by a heating roll group, is stretched in the longitudinal direction at a stretching ratio of 3 to 8 in a single-stage or in a multi-stage (when re-stretching is performed in the longitudinal direction, the stretching ratio in the first stage is 2.5 to 4), and is cooled by a cooling roller group at a temperature of 20 to 50° C. The stretching rate in the longitudinal direction is preferably in the range of 5,000 to 200,000%/minute. Subsequently, stretching in the width direction is performed. As a method for stretching in the width direction, for example, a method using a tenter is generally used. The stretching in the width direction is preferably performed at a stretching ratio of 3 to 8 (when re-stretching is performed in the width direction, the stretching ratio in the first stage is 3 to 4.5), at a stretching rate of 2,000 to 10,000%/minute, and at a temperature of 95 to 160° C. In addition, when necessary, re-stretching in the longitudinal direction and/or re-stretching in the width direction may be performed. In the case described above, the stretching in the longitudinal direction is preferably performed at a stretching ratio of 1.2 to 1.8 using a heating roller group at a temperature of 80 to 180° C., and the stretching in the width direction is preferably performed at a stretching ratio of 1.2 to 2.0 and at a temperature of 110 to 225° C. by a method using a tenter. Next, this stretched film is subjected to heat treatment while a tension is applied or removed in the width direction. In the step described above, the heating temperature is 200 to 230° C. and is preferably 215 to 240° C., and the heating time is preferably 0.2 to 10 seconds.

[Measurement Method for Physical Properties and Evaluation Method for Effects]

The measurement methods for physical properties and the evaluation methods for effects of the present invention are described below.

(1) Height and Number of Projections on Surface

Measurement is performed 10 times at different measurement positions using an atomic force microscope (AMF) in accordance with the conditions shown below.

Apparatus: NanoScope III AFM (Digital Instrument, Inc.)
Cantilever: Silicon single crystal
Scanning Mode: Tapping mode
Scanning Range: 5 $\mu$m×5 $\mu$m
Scanning Rate: 0.5 Hz
Measurement Circumstance: temperature of 25° C. and relative humidity of 55%

The number of projections existing in the range of 2 to 50 nm from the flat surface is measured, and the average value is converted into the number per unit area (mm$^2$).

(2) Actual Average Particle Diameter Dv

After a rectangular film formed by cutting is placed on a slide glass, and liquid paraffin is dripped thereon, a cover glass is placed on the liquid paraffin. Subsequently, when the surface of the film is observed by a dark-field method using a transmission optical microscope, particles existing inside the film can be observed from place to place. In this step, an image focused on the particle in the vicinity of the surface is transferred into a hi-vision monitor of an image analysis apparatus, and input images of foreign materials are binarized so that the number of particles and the area thereof are obtained. This area is represented by a circle having an area equal thereto, and the diameter of the circle is regarded as the actual average diameter of the particle. This observation is repeated 10 times at different measurement positions.

When at least two types of particles having different particle diameters exist in the film, distribution of the diameters of circles described above has at least two peaks. In the case described above, the actual average particle diameters corresponding to the individual distributions are measured, respectively.

(3) Surface Roughness Ra

By using a high-precision thin-film step measuring machine ET-10 manufactured by Kosaka Laboratory Ltd., the center line average surface roughness Ra is measured. The measurement is performed 20 times by scanning in the film width direction under the conditions described below, and the surface roughness is the average value of the measurement results.

Tracer Tip Radius: 0.5 $\mu$m
Tracer pressure: 5 mg
Measuring Length: 1 mm
Cut-Off Value: 0.08 mm (4) Average Particle Diameter (Weight Average Particle Diameter) of Inert Particles The cross-sectional view of a film is observed at a magnification of 10,000 or more by using a transmission electron microscope (TEM). The thickness of a sample for TEM measurement is approximately 100 nm, and the measurement is performed at different 100 positions or more. The weight average of diameters of circles having areas equal to those of particles which are actually measured is regarded as the average particle diameter D of the inert particles.

When at least two types of particles having different particle diameters exist in the film, distribution of the diameters of circles described above has at least two peaks. In the case described above, the average particle diameters corresponding to the individual distributions are calculated, respectively.

(5) Contents of Polymer 1, Polymer 2, and Inert Particles

Both polymer 1 and the polymer 2 are dissolved in an appropriate solvent, and $^1$H nuclear NMR (nuclear magnetic resonance) spectrum is measured. An appropriate solvent differs depending on the type of polymer; however, for example, hexafluoroisopropanol (HFIP)/deuterated chloroform may be used. From the spectrum thus measured, areal intensities of peaks of specific absorption of the polymer 1 and the polymer 2 (for example, an absorption of an aromatic proton of terephthalic acid when poly(ethylene terephthalate) is used, or an absorption of an aromatic proton of bisphenol-A of PEI) are obtained, and from the ratio therebetween and the number of protons, the molar ratio between the polymer 1 and the polymer 2 are obtained. In addition, the weight ratio between the polymer 1 and the polymer 2 is also obtained from the weights corresponding to constituent units of the individual polymers. The measurement conditions are shown below by way of example; however, since they vary depending on the type of polymer, the conditions are not limited thereto.

Apparatus: BRUKER DRX-500 (Bruker, Inc.)
Solvent: HFIP/Deuterated chloroform
Measurement Frequency: 499.8 MHz
Standard: Tetramethylsilane (TMS) (0 ppm)
Measurement Temperature: 30° C.
Measurement Range: 10 KHz
Data Points: 64 K
Acquisition time: 4.952 seconds
Pulse Delay Time: 3.048 seconds
Number of Acquisitions: 256

In addition, when necessary, FT-IR microscopic method (Fourier transformer infrared microspectrometry) may be used for composition analysis. In the case described above, the ratio of the peak of a carbonyl group of a polyester resin to the peak of each material other than the polyester resin is obtained, so that the composition analysis is performed. In order to obtain the weight ratio from the peak-height ratio, a calibration curve is prepared beforehand by using samples having known weight ratios, and the ratio of the polyester resin to the total of the materials other than the polyester resin is obtained by using this calibration curve. From this data and the content of the inert particles, the ratio of PEI is obtained. In addition, if necessary, an x-ray microanalyzer may also be used.

In addition, in order to obtain the content of the inert particles, a solvent which dissolves the polymer 1 and the polymer 2 but the inert particles is selected, and the polymer 1 and the polymer 2 are dissolved therein and are then centrifuged, whereby the content on a wt % basis of the inert particles is obtained.

(6) Content of Inert Particles in Easy-Slip Smooth Layer (C Layer)

The film surface at the C layer side is observed at least 10 positions by using a scanning electron microscope (SEM) at a magnification of approximately 30,000, and the number of projections per unit area (mm$^2$) is measured.

(7) Laminate Thickness

A cross-section of a film is observed by a method using a ultra-thin film (subjected to RuO$_4$) at an accelerating voltage of 100 kV using a transmission electron microscope (H-600 Model manufactured by Hitachi, Ltd.). From the observation result of the cross-sections, the thicknesses of the individual layers are obtained. Magnification used for this measurement is optionally selected depending on the thickness of a laminate to be measured, and in general, a magnification of 10,000 to 100,000 is preferably selected.

Among inert particles existing from the surface to 3,000 nm in the thickness direction of the film, which can be measured by a secondary ion mass spectroscopic (SIMS) apparatus, the ratio (M$^+$/C$^+$) on a concentration basis of an element contained in one type of inert particle (or PEI) having the highest concentration to the carbon of the polyester resin is analyzed from the surface to 3,000 nm in the thickness direction. The concentration of the element contained in the inert particles (or PEI) is low at the surface and is gradually increased from the surface to the inside of the film. According to the film of the present invention, the concentration of the element of the inert particles (or PEI) reaches the maximum value and is then gradually decreased. In this distribution of the concentration, a depth at which the concentration of the element contained in the inert particles (or PEI) is decreased to one-half of the maximum value is determined to a laminate thickness. The conditions are described below.

i) Measurement Apparatus

Secondary Ion Mass Spectroscopic (SIMS) Apparatus A-DIDA3000 produced by Atomika, Germany ii) Measurement Conditions Primary Ion Species: O$_2^-$ Accelerating Voltage for Primary Ion: 12 KV Primary Ion current: 200 nA Raster Range: 400 µm×400 µm Analyzed Range: Aperture rate 30%

Degree of Vacuum: 5.0×10$^{-9}$ Torr

E-Gun: 0.5 KV-3.0 A

When the inert particles having the highest concentration from the surface to 3,000 nm in the thickness direction are organic polymeric particles, it is difficult to measure the organic polymeric particles by SIMS, and in the case described above, the laminate thickness may be obtained by measuring a depth profile equivalent to that described above using XPS (x-ray photoelectron spectroscopy) or IR (infrared spectroscopy) while the surface is being etched.

(8) Young's Modulus

In accordance with the method specified in ASTM-D882, the Young's modulus is measured by using an Instron type tensile tester. The measurement conditions are described below.

Measurement Apparatus: Automatic Film Stretch Measuring Apparatus "Tensilon AMF/RTA-100" manufactured by Orientec Corporation Size of Sample: A width of 10 mm×an effective specimen length of 100 mm Stretching rate: 200 mm/minute Measurement Circumstances: A temperature of 23° C., and a relative humidity of 65%

(9) Heat Shrinkage (Dimensional Stability in Fabrication and Storage Steps)

The measurement is carried out in accordance with JIS C2318.

Size of Sample: A width of 10 mm and an interval between the standard lines for measurement of 200 mm Measurement Conditions: A temperature of 100° C., a treatment for 30 minutes under unloaded condition The heat shrinkage is calculated in accordance with the following formula.

Heat Shrinkage (%)=[($L_0$−$L$)/$L_0$]×100

$L_0$=the interval between the standard lines for measurement before heat treatment $L$=the interval between the standard lines for measurement after heat treatment When the heat shrinkage in the longitudinal direction is 1% or less, and the heat shrinkage in the width direction is 0.5% or less, the dimensional stability is regarded as superior in fabrication and storage steps and is represented by (A), and when the heat shrinkages in both directions are out of the ranges mentioned above, the dimensional stability is regarded as inferior in fabrication and storage steps and is represented by (C).

(10) Actual Average Particle Diameter/Average Particle Diameter (Dv/D)

Dv/D is calculated from the actual average particle diameter Dv obtained by the measurement described in (2) and the average particle diameter of the inert particles obtained by the measurement described in (4).

When there are at least two types of particles having different particle diameters in the film, since at least two actual average particle diameters and at least two average particle diameters are calculated, the Dv/D of each of said at least two particles is first obtained, and weighted average Dv/D is then calculated by using the factor obtained in accordance with the contents of different types of particles.

(11) Numbers H1 and H2 of Coarse Projections

After two surfaces (100 cm$^2$) to be measured are overlaid on each other and brought into close contact by an electrostatic force (applied voltage of 5.4 kV), the height of the coarse projections is measured from Newton's rings generated by light interference at the coarse projections between the two films, and the number of coarse projections providing at least single-fringe ring and the number of coarse projections providing at least two-fringe rings are represented by H1 and H2, respectively. In this step, the light source is a halogen lamp provided with a band pass filter for a wavelength of 564 nm.

When the measurement is difficult to perform using the measurement area mentioned above, the measurement area is optimally changed, and the result may be converted into a value per 100 cm$^2$ (for example, when an area is 1 cm$^2$ measurement is performed for 50 view areas, and the result is converted into the value per 100 cm).

In addition, when the measurement method described above is difficult to perform, the number H1 and H2 of coarse projections may be obtained by measuring the number of projections having a height of 0.28 µm or more and the number of projections having a height of 0.56 µm or more using a three-dimensional roughness meter SE-3AK manufactured by Kosaka Laboratory Ltd. The measurement described above is performed fifty times by scanning a tracer in the width direction of the film under the conditions described below.

Tracer Tip Radius: 2 µm,

Tracer pressure: 0.07 g,

Measuring Width×Length: 0.5 mm×15 mm (0.1 mm pitch), and

Cut-Off Value: 0.08 mm.

In addition, when necessary, a known method, such as an atomic force microscope (AFM) or a four-detection type scanning electron microscope (SEM) for measuring the number of projections on the film surface may also be used.

A polyester film having a number H1 of 100/cm² or less is marked by A, and a polyester film having a number H1 of more than 100/cm² is marked by C. In addition, a polyester film having a number H2 of 10/cm² or less is marked by A, and a polyester film having a number H2 of more than 10/cm² is marked by C.

(12) Rate of Change in Dimensions in Width Direction

Size of sample: 100 mm in the longitudinal direction and 30 mm in the width direction After the sample described above is held at 23° C. and at a relative humidity (RH) of 65% for 24 hours without applying a load, the sample is adhered to a chromium mask manufactured by Dai Nippon Printing Co., Ltd. by using static electricity, and the length ($L0_W$) in the width direction is measured by an optical microscope. Next, the sample is held at 60° C. and at a relative humidity of 85% for 72 hours while a load of 32 MPa is being applied thereto in the longitudinal direction. Next, after the load is removed, the sample is held at 23° C. and at 65% RH for 24 hours without applying a load, and the length ($L1_W$) in the width direction is then measured. The rate of change of dimensions is obtained in accordance with the formula below.

$$\text{The rate of change in the dimensions} = [(L1_W - L0_W)/L0_W] \times 100$$

When the sample has an absolute value of a rate of change in the dimensions of 0.4 or more, it may not be used for a high-density magnetic recording medium and is marked by (C).

(13) Electromagnetic Conversion Characteristics of Coated Magnetic Tape (S/N)

A multilayer coating of a magnetic paint and a non-magnetic paint, having compositions described below, is performed on a surface of a film by using an extrusion coater, in which an upper layer is composed of the magnetic paint having a thickness of 0.1 μm, and the thickness of the underlying non-magnetic layer is optionally changed. The film thus prepared is magnetically oriented and is then dried. Next, after a back coating material having the composition described below is applied to the surface opposite to that having the magnetic and the non-magnetic layers, a calendar treatment is performed at 85° C. and at a line pressure of 200 kg/cm using a compact test calendering apparatus (steel/nylon rollers, 5 stages), and subsequently, the film thus treated is cured at 60° C. for 48 hours. The film thus cured is slit into a tape having a width of 8 mm, and a pancake is then formed. A tape 200 m long obtained from this pancake is placed in a cassette, thereby forming a cassette tape.

(Composition of Magnetic Paint)

Powdered ferromagnetic metal: 100 parts by weight
Modified vinyl chloride copolymer: 10 parts by weight
Modified polyurethane: 10 parts by weight
Polyisocyanate: 5 parts by weight
Stearic acid: 1.5 parts by weight
Oleic acid: 1 part by weight
Carbon black: 1 part by weight
Alumina: 10 parts by weight
Methylethyl ketone: 75 parts by weight
Cyclohexanone: 75 parts by weight
Toluene: 75 parts by weight (Composition of Back Coating Material)

Carbon black (average particle diameter of 20 mm): 95 parts by weight
Carbon black (average particle diameter of 280 mm): 10 parts by weight
α alumina: 0.1 parts by weight
Modified polyurethane: 20 parts by weight
Modified vinyl chloride copolymer: 30 parts by weight
Cyclohexanone: 200 parts by weight
Methylethyl ketone: 300 parts by weight
Toluene: 100 parts by weight The video S/N ratio is measured by using a commercially available VTR for Hi8. The measurement of SIN ratio is performed by supplying a signal from a TV test signal generator using a video noise meter and is compared to a tape formed in Comparative Example 5 which is regarded as 0 dB. In this measurement, the running conditions are at 25° C. and at 60% RH.

The electromagnetic conversion characteristics are compared with those in comparative example 5 and are evaluated in accordance with the standards described below.

A: +0.5 dB or more

Superior level to be used in the application of a high-density magnetic recording tape B: −0.5 dB or more, and less than +0.5 dB Level to be used in the application of a high-density magnetic recording tape C: less than −0.5 dB Insufficient level to be used in the application of a high-density magnetic recording tape

(14) Dropout

By using the cassette tape and the device described above, the number of dropouts (DO) is measured. For the measurement of the number of DO, recording is performed on the tape formed according to the present invention using a commercially available camera integrated Hi8 tape recorder, and the number of block-shaped mosaics is counted which is observed on a monitor screen while reproducing is performed for 1 minute. The running conditions are at 25° C. and at 60% RH.

(A): The number of DO ≦ 30

Level to be used in the application of a high-density magnetic recording tape (C): The number of DO > 30

Insufficient level to be used in the application of a high-density magnetic recording tape

(15) Track Deviation

The film thus cured is slit into a tape having a width of ½ inch, and a tape 670 m long is placed in a cassette, thereby forming a cassette tape.

Cassette tape is held in an atmosphere at 60° C. and at 80% RH for 100 hours. Subsequently, when the cassette tape thus treated is run with a Tape Running Tester sequentially under the conditions 1 to 5 described below, the change in dimension in the tape width is continuously measured using a laser-type dimension-measurement device, and the track deviations are obtained before and after the running as described below. The initial value of the tape width at 25° C. and at 65% RH and the tape width after the running are represented by L0 (μm) and L1 (μm), respectively, and the track deviation is calculated based on the formula below.

$$\text{Track deviation} = |L0 - L1|$$

Condition 1: 20° C., 50% RH, a tension of 85 g, and the number of running is 3.

Condition 2: 20° C., 50% RH, a tension of 140 and the number of running is 3.

Condition 3: 40° C., 60% RH, a tension of 140 g, and the number of running is 100.

Condition 4: 20° C., 50% RH, a tension of 140 g, and the number of running is 3.

Condition 5: 20° C., 50% RH, a tension of 85 g, and the number of running is 3.

When this track deviation is 0.5 μm or less, the film is regarded as a film which can be used in the application of a high-density magnetic recording tape and is represented by (A), and when this track deviation is more than 0.5 μm, the film is regarded as a film which cannot be used in the application of a high-density magnetic recording tape and is represented by (C).

(16) Intrinsic Viscosity [η]

The intrinsic viscosity n is calculated from a solution viscosity measured in ortho-chlorophenol at 25° C. using the formula below.

$$\eta_{sp}/C[\eta]+K[\eta]^2 \cdot C$$

In the above formula, $\eta_{sp}$ is (solution viscosity/solvent viscosity) −1, C means the weight of a polymer dissolved in 100 ml of a solvent (g/100 ml; it is generally 1.2), and K is the Huggins constant (is set to 0.34). In addition, the solution viscosity and the solvent viscosity are measured by using an Ostwald viscometer.

(17) Extrapolated Glass Transition-Starting Temperature ($Tg_{onset}$), Glass Transition Temperature (Tg)

Specific heat is measured under conditions by an apparatus as described below, and transition temperatures are determined in accordance with JIS K7121.

Apparatus: TA Instrument Temperature Modulated DSC

Measurement Conditions:

Heating Temperature: 270 to 570° K (RCS Cooling Method)

Temperature Calibration: Melting Points of high purity indium and tin

Temperature Modulation Amplitude: ±1° K

Temperature Modulation Cycle: 60 seconds

Increase Step in Temperature: 5 K

Sample Weight: 5 mg

Container for Sample: Aluminum-made open container (22 mg)

Container for Reference: Aluminum-made open container (18 mg)

The glass transition temperature is calculated by the following formula.

Glass Transition Temperature=(Extrapolated Glass Transition-Starting Temperature+Extrapolated Glass Transition-Ending Temperature)/2

(18) Electromagnetic Conversion Characteristics (S/N) of Deposited Magnetic Tape A cobalt-oxygen thin-film 150 nm thick is deposited in the presence of a small amount of oxygen on the surface (f surface) opposite to the B layer of the film according to the present invention by using a continuous vacuum deposition apparatus. Next, on this cobalt-oxygen thin-film, a diamond-like carbon protective film 10 nm thick is formed by a known method, and on the protective film, a fatty acid ester-based lubricant containing fluorine 3 nm thick is applied. Subsequently, on the surface at the B layer side, a back coating layer 500 nm thick composed of carbon black, polyurethane, and silicone is provided, and after the film thus formed is slit into a tape 6.35 mm wide by using a slitter, the tape is wound around a real, whereby a magnetic recording tape (DVC video tape) is formed.

As the evaluation of the properties of this magnetic recording tape, video S/N ratio is measured by using a modified commercially available camera integrated video-tape recorder. For the measurement of the S/N ratio, signals are supplied from a TV test signal generator, and the S/N ratio is measured with reference to the tape formed of a film prepared in Comparative Example 8, which is regarded as 0 decibel (dB), using a video noise meter. The performance is evaluated in accordance with the standards described below. The running conditions are 25° C. and 60% RH.

A: +0.5 dB or more

B: −0.5 dB or more to less than +0.5 dB

C: less than −0.5 dB

In this evaluation, A means that the film has superior quality used for a deposited high-density magnetic recording tape, B means that the film can be used for the above application, and C means that the film cannot be used for the above application.

(19) Deposition Stability

Continuous vacuum deposition described in the above (10) is performed for 10 pieces of the film of the present invention having a length of 3,000 m, and process stability in the deposition step is evaluated in accordance with the standards described below.

A: the number of films in which film breakage occurs due to the precipitation of oligomers or wrinkles is formed due to the shrinkage in the width direction or the like is 2 or less.

B: the number of films in which film breakage occurs due to the precipitation of oligomers or wrinkles is formed due to the shrinkage in the width direction or the like is 3 to 4.

C: the number of films in which film breakage occurs due to the precipitation of oligomers or wrinkles are formed due to the shrinkage in the width direction or the like is 5 or more.

In the evaluation described above, A means that the film has superior process stability in a deposition step, B means that the film can be used in a deposition step, and C means that the film cannot be used.

(20) Oligomer-Restraining Property

The film is held in an oven at 150° C. for 30 minutes, so that low-molecular weight materials are precipitated on the film surface. Subsequently, 25 positions on the surface (in the case of a laminated film, the surface at the side (f surface) opposite to the B layer of the film is observed at a total magnification of 1,000 using a differential interference microscope. The number of low-molecular materials 0.5 mm long is counted in each observed area, the total number of low-molecular materials in the 25 observed positions is converted to the number per 100 $cm^2$, and this converted number is regarded as the number of oligomers precipitated on the surface (1/100 $cm^2$).

When the number of the precipitated oligomers is 2,000/100 $cm^2$ or less, the oligomer-restraining property is superior and is represented by A, and when the number of the precipitated oligomer is more than 2,000/100 $cm^2$, the oligomer-restraining property is inferior and is represented by C.

(21) Coated Magnetic Tape Properties

Among (13) the electromagnetic conversion characteristics of coated magnetic tape, (14) the dropout, and (15) the track deviation described above, a tape classified as A or as B in every property described above is classified as A which means that the tape can be used for the application of high-density recording magnetic tapes having a coated magnetic layer, and a tape classified as C in at least one of the properties described above is classified as C which means that the tape has not enough properties used for the application described above.

(22) Deposited Magnetic Tape Properties

In consideration of (9) the heat shrinkage, (18) the electromagnetic conversion characteristics, and (19) the deposition stability, the deposited magnetic tape properties are evaluated in accordance with the standards described below.

A: A tape classified as A in the every property described above, or a tape classified as A in the two properties and classified as B in the other property.

C: A tape classified as C in one of the properties described above, or a tape classified as B in two properties described above.

In this evaluation, A means that the tape is preferably used for the application of magnetic recording media having a deposited magnetic layer, and C means that the tape is not suitably used for the application above.

Next, the present invention will be described with reference to the following examples.

EXAMPLE 1

Pellets (50 wt %, a Tg of 80° C.) of poly(ethylene terephthalate) (PET) having an intrinsic viscosity of 0.65 formed by a known method and "Ultem" 1010 (50 wt %, a Tg of 216° C.) having an intrinsic viscosity of 0.68 manufactured by General Electric Company were supplied to a vented biaxial extruder (a residence time of 250 seconds), in which the screws were designed to rotate in the same direction and the temperature was maintained at 285° C., and after they were filtrated by using a fiber sintered stainless steel filter having a cut of 10 $\mu$m, blend chips which contained 50 wt % of PEI and had an intrinsic viscosity of 0.65 were produced. When this blend chip was observed using a transmission electron microscope at a magnification of 30,000, a phase separated structure approximately 200 nm in diameter was observed.

Next, film-formation was performed by using an extruder. A mixture of 15 wt % of the blend chips obtained by the pelletizing step described above; 63 wt % of pellets of poly(ethylene terephthalate) which did not substantially contain inert particles and had an intrinsic viscosity of 0.62; 2 wt % of pellets of poly(ethylene terephthalate) which contained 2 wt % of crosslinked divinylbenzene particles having a weight average particle diameter of 0.5 $\mu$m and which had an intrinsic viscosity of 0.62; and 20 wt % of pellets of poly(ethylene terephthalate) which contained 2 wt % of γ-alumina particles having a weight average particle diameter of 0.025 $\mu$m and which had an intrinsic viscosity of 0.62 was dried under vacuum at 180° C. for 3 hours and was then supplied to an extruder heated to 275° C.

Subsequently, after the polymer thus formed was filtrated sequentially using a sand filter, a fiber sintered stainless steel filter having a cut of 1.2 $\mu$m, and a fiber sintered stainless steel filter having a cut of 0.8 $\mu$m in that order, the polymer was brought into close contact with a casting drum having a surface temperature of 25° C. so as to be solidified by cooling while static electricity is being applied to the casting drum, whereby an unstretched film was obtained.

This unstretched film was stretched in two stages using a roll-type stretching apparatus in the longitudinal direction at a stretching ratio of 3.0, at a stretching rate of 60,000%/minute, and at a temperature of 125° C., and was then further stretched using a tenter in the width direction at a stretching ratio of 3.4, at a stretching rate of 3,000%/minute, and at a temperature of 128° C. Subsequently, the film was re-stretched in one stage using a roll-type stretching apparatus in the longitudinal direction at a stretching ratio of 1.4 and at a temperature of 140° C., and was then re-stretched using a tenter in the width direction at a stretching ratio of 1.9 and at a temperature of 205° C. After a heat treatment under the condition of a constant length at 220° C. for 8 seconds was performed, a relaxation treatment was performed at a relaxation rate of 2% in the width direction, thereby yielding a polyester film approximately 6 $\mu$m thick. The Young's modulus in the longitudinal direction was 6.5 GPa, and the Young's modulus in the width direction was 4.5 GPa.

As shown in Table 1, this polyester film had a small number of coarse projections and had superior properties, such as the oligomer-restraining property and the dimensional stability in the width direction.

EXAMPLE 2

In this example, 50 wt % of pellets of poly(ethylene terephthalate) having a Tg of 80° C. and an intrinsic viscosity of 0.85 formed by a known method and 50 wt % of "Ultem" 1010 having a Tg of 216° C. and an intrinsic viscosity of 0.68 manufactured by General Electric Company were supplied to a vented biaxial extruder, in which the screws were designed to rotate in the same direction and the temperature was maintained at 290° C., and blend chips (II) containing 50 wt % of PEI were produced.

Next, film-formation was performed by using two extruders. A mixture of 20 wt % of the blend chips obtained by the pelletizing step described above; 58 wt % of pellets of poly(ethylene terephthalate) which did not substantially contain inert particles and had an intrinsic viscosity of 0.62; 3 wt % of pellets of poly(ethylene terephthalate) which contained 2 wt % of crosslinked divinylbenzene particles having a weight-average particle diameter of 0.17 $\mu$m and which had an intrinsic viscosity of 0.62; and 20 wt % of pellets of poly(ethylene terephthalate) which contained 2 wt % of γ-alumina particles having a weight average particle diameter of 0.025 $\mu$m and which had an intrinsic viscosity of 0.62 was dried under vacuum at 180° C. for 3 hours and was then supplied to an extruder A (for A layer) heated to 295° C. A mixture of 20 wt % of the blend chips obtained by the pelletizing step described above; 67 wt % of pellets of poly(ethylene terephthalate) which did not substantially contain inert particles and had an intrinsic viscosity of 0.62; 12 wt % of pellets of poly(ethylene terephthalate) which contained 2 wt % of spherical silica particles having a weight average particle diameter of 0.17 $\mu$m and which had an intrinsic viscosity of 0.62; and 1 wt % of pellets of poly(ethylene terephthalate) which contained 1 wt % of crosslinked divinylbenzene particles having a weight average particle diameter of 0.75 $\mu$m and which had an intrinsic viscosity of 0.62 was dried under vacuum at 180° C. for 3 hours and was then supplied to an extruder B (for B layer) heated to 295° C. Subsequently, after the polymer in the extruder A was filtrated sequentially using a sand filter, a fiber sintered stainless steel filter having a cut of 1.2 $\mu$m, and a fiber sintered stainless steel filter having a cut of 0.8 $\mu$m in that order, and the polymer in the extruder B was filtrated sequentially using a sand filter, and a fiber sintered stainless steel filter having a cut of 3 $\mu$m in that order, these two polymers were fed into a T die, and these two polymers were brought into close contact with a casting drum having a surface temperature of 25° C. so as to be solidified by cooling while static electricity is being applied to the casting drum, whereby an unstretched and two-layered film (the ratio in thickness of A to B was 11 to 1) was obtained.

This unstretched film was stretched in two stages using a roll-type stretching apparatus in the longitudinal direction at a stretching ratio of 3.5, at a stretching rate of 70,000%/minute, and at a temperature of 95° C., and was then further stretched using a tenter in the width direction at a stretching ratio of 3.0, at a stretching rate of 3,000%/minute, and at a temperature of 120° C. Subsequently, the film was re-stretched in one stage using a roll-type stretching apparatus in the longitudinal direction at a stretching ratio of 1.7 and at a temperature of 130° C., and was then re-stretched using a tenter in the width direction at a stretching ratio of 1.2 and at a temperature of 180° C. After a heat treatment under the condition of a constant length at 210° C. for 8 seconds was performed, a relaxation treatment was performed at a relaxation rate of 2% in the width direction, thereby yielding a polyester film approximately 6 μm thick. The thicknesses of the A layer and the B layer were 5.5 μm and 0.5 μm, respectively. The Young's modulus in the longitudinal direction was 6.8 GPa and the Young's modulus in the width direction was 4.5 GPa. The surface roughness at the B layer side was 11.5 nm, the surface roughness of the surface opposite to the B layer was 9 nm, and Dv/D was 4.5.

As shown in Table 1, this polyester film had a small number of coarse projections and had superior properties, such as the oligomer-restraining property and the dimensional stability in the width direction.

EXAMPLE 3

An unstretched film having a two-layered structure was formed in a manner equivalent to that in Example 2 except that a blend polymer was used as the B layer polymer which was composed of PET and PEI (weight ratio of 90 to 10) containing 3 wt % of crosslinked divinylbenzene particles having a weight average particle diameter of 0.3 μm and 0.1 wt % of spherical silica particles having a weight average particle diameter of 1.2 μm. Subsequent stretching and heat treatment were performed as Example 1, thereby forming a laminated polyester film approximately 6 μm thick. The thicknesses of the A layer and the B layer were 5.5 μm and 0.5 μm, respectively. The Young's modulus in the longitudinal direction was 6 GPa, and the Young's modulus in the width direction was 4.7 GPa. The surface roughnesses of the B layer side and of the side opposite to the B layer were 25 nm and 10.5 nm, respectively, and Dv/D was 1.8.

As shown in Table 1, this polyester film had a small number of coarse projections and had superior properties, such as the oligomer-restraining property and the dimensional stability in the width direction.

EXAMPLE 4

In this example, 50 wt % of pellets of poly(ethylene terephthalate) having a Tg of 80° C. and an intrinsic viscosity of 0.85 formed by a known method and 50 wt % of "Ultem" 1010 having a Tg of 216° C. and an intrinsic viscosity of 0.68 manufactured by General Electric Company were supplied to a vented biaxial extruder, in which the screws were designed to rotate in the same direction and the temperature was maintained at 290° C., and blend chips containing 50 wt % of PEI were produced. When this blend chip was observed by a transmission electron microscope at a magnification of 30,000, a phase separation structure approximately 400 nm in diameter was observed.

Next, film-formation was performed by using two extruders. A mixture of 20 wt % of the blend chips obtained by the pelletizing step described above and 80 wt % of pellets of poly(ethylene terephthalate) which did not substantially contain inert particles and had an intrinsic viscosity of 0.62 was dried under vacuum at 180° C. for 3 hours and was then supplied to an extruder A heated to 290° C. A mixture of 20 wt % of the blend chips obtained by the pelletizing step described above; 60 wt % of pellets of poly(ethylene terephthalate) which did not substantially contain inert particles and had an intrinsic viscosity of 0.62; and 20 wt % of pellets of poly(ethylene terephthalate) which contained 2 wt % of crosslinked divinylbenzene particles having a weight average particle diameter of 0.25 μm and which had an intrinsic viscosity of 0.62 was dried under vacuum at 180° C. for 3 hours and was then supplied to an extruder B heated to 295° C. Subsequently, after the polymer in the extruder A was filtrated sequentially by using a sand filter, a fiber sintered stainless steel filter having a cut of 1.2 μm, and a fiber sintered stainless steel filter having a cut of 0.8 μm in that order, and the polymer in the extruder B was filtrated using a sand filter, and a fiber sintered stainless steel filter having a cut of 3 μm in that order, these two polymers were laminated in a rectangular confluent block (feed block) for forming a A/B two-layered laminate. The thicknesses of the individual layers were adjusted by controlling the extrusion amount by adjusting the rotation numbers of gear pumps equipped in the individual production lines. By using an electrostatic casting method, the laminate thus formed was wound around a casting drum having a surface temperature of 25° C. so as to be solidified by cooling, thereby yielding an unstretched two-layered film (thickness ratio A/B was 10/1).

This unstretched film was stretched using a roll-type stretching apparatus in the longitudinal direction at a stretching ratio of 3.1 and at a temperature of 110° C. This stretching was performed by using a difference in peripheral velocity between two sets of rollers. An aqueous solution having the composition described below was applied to the A layer of this uniaxial stretched film.

| | |
|---|---|
| Methyl cellulose | 0.10 wt % |
| A water-soluble polyester | 0.3 wt % |
| Aminoethyl silane coupling agent | 0.01 wt % |
| Carnauba wax | 0.2 wt % |
| Acrylic Particle having an average particle diameter of 20 nm | 0.01 wt % |
| Coating concentration of solid component | 20 mg/m$^2$ |

In addition, this stretched film was further stretched by using a tenter in the width direction at a stretching ratio of 3.4 and at a temperature of 100° C. Subsequently, the film was re-stretched in one stage using a roll-type stretching apparatus in the longitudinal direction at a stretching ratio of 1.55 and at a temperature of 150° C., and was then re-stretched using a tenter in the width direction at a stretching ratio of 1.6 and at a temperature of 195° C. After a heat treatment under the condition of a constant length at 205° C. for 8 seconds was performed, a relaxation treatment was performed at a relaxation rate of 5 t in the width direction, thereby yielding a laminated polyester film approximately 6 μm thick. The laminate structure is an A/B laminated structure provided with a coating layer (C layer) on the side opposite to the B layer. The thicknesses of the A layer and the B layer were 5.5 μm and 0.5 μm, respectively. The Young's modulus in the longitudinal direction was 5.2 GPa, and the Young's modulus in the width direction was 6.1 GPa. The surface roughness at the B layer side was 14.5 nm, the surface roughness of the surface opposite to the B layer was 4.5 nm, and the number of projections having a height of 5 to 25 nm on the surface opposite to the B layer was 4,300,000/mm².

As shown in Table 1, this polyester film had a small number of coarse projections and had superior properties, such as the oligomer-restraining property and dimensional stability in the width direction.

EXAMPLE 5

In this example, film-formation was performed by using three extruders. The polymer compositions and the contents of particles of the A and the B layers were the same as those in Example 4, and a D layer polymer was composed of PET and PEI in the ratio of 90 to 10 on a wt % basis and 2 wt % of spherical silica particles having a weight average particle diameter of 60 nm. The B and the D layers contained 0.3 wt % of dodecylbenzene sodium sulfonate, and the A layer contained 0.1 wt % thereof. In addition, the methods for filtrating the A and the B layer polymers were equivalent to that described in Example 4, and the D layer polymer was filtrated sequentially by using a sand filter, a fiber sintered stainless steel filter having a cut of 1.2 μm, and a fiver sintered stainless steel filter having a cut of 0.8 μm in that order. An unstretched three-layered film (the thickness ratio of D, A, and B was 0.15, 11, and 1) was formed.

A D/A/B three-layered polyester film approximately 6.1 μm thick was obtained from this unstretched film by the same stretching method, stretching temperature, stretching ratio, and so on as those described in Example 4. However, the application of the aqueous solution described in Example 4 was not performed. The thicknesses of the A layer, the B layer, and the D layer were 5.5 μm, 0.5 μm, and 0.075 μm, respectively. The Young's modulus in the longitudinal direction was 5.2 GPa, and the Young's modulus in the width direction was 6.1 GPa. The surface roughnesses of the B layer side and the side opposite thereto were 14.5 nm and 6.5 nm, respectively, and the number of projections having a height 5 to 25 nm on the surface opposite to the B layer was 5,100,000/mm².

As shown in Table 1, this polyester film had a small number of coarse projections and had superior properties, such as the oligomer-restraining property and the dimensional stability in the width direction.

EXAMPLE 6

A polymer having the same composition as that of the B layer in Example 4 (in which the ratio PET/PEI was 90/10, and 0.3 wt % of cross-linked divinylbenzene particles having a weight average particle diameter of 0.27 μm was contained) was prepared and was then formed into an unstretched single film without being laminated to another film.

Under the same conditions as those in Example 4, such as the composition of an aqueous solution, the stretching method, and the stretching conditions, a polyester film approximately 6 μm thick was formed. The Young's modulus in the longitudinal direction was 5.2 GPa, and the Young's modulus in the width direction was 6.1 GPa.

As shown in Table 1, this polyester film had a small number of coarse projections and had superior properties, such as the oligomer-restraining property and the dimensional stability in the width direction.

EXAMPLE 7

A blend polymer composed of PET and PEI (having a ratio PET/PEI on a weight basis of 90/10, and containing 0.24 wt % of crosslinked divinylbenzene particles having a weight average particle diameter of 0.17 μm and 0.01 wt % of spherical silica particles having a weight average particle diameter of 0.75 μm) was used as the A layer polymer, and unstretched single films were formed in a manner equivalent to that in Example 2 except that lamination of the films was not performed. Subsequently, stretching and heat treatment were performed under the same conditions as those in Example 2, a laminated polyester film approximately 6 μm thick was formed. The thicknesses of the A layer and the B layer were 5.5 μm and 0.5 μm, respectively. The Young's modulus in the longitudinal direction was 6 GPa, and the Young's modulus in the width direction was 4.7 GPa. The surface roughnesses at the B layer side and the side opposite thereto were 9 nm and 8.9 nm, respectively, and Dv/D was 2.1.

As shown in Table 1, this polyester film had a small number of coarse projections and had superior properties, such as the oligomer-restraining property and the dimensional stability in the width direction.

COMPARATIVE EXAMPLE 1

A polyester film approximately 6 μm thick was formed in a manner equivalent to that in Example 1 except that filtration was not performed when a blend chips were formed, and the filtration in the film-forming step was changed to one step filtration using a fiber sintered stainless steel filter having a cut of 3 μm. The Young's modulus in the longitudinal direction was 6.5 GPa, and the Young's modulus in the width direction was 4.5 GPa.

As shown in Table 1, according to the method described above, a polyester film having high quality in which the numbers of coarse projections H1 and H2 were within the ranges of the present invention could not be formed.

COMPARATIVE EXAMPLE 2

Without forming blend chips, a mixture of 30 wt % of "Ultem" 1010 having a Ta of 216° C. and an intrinsic viscosity of 0.68; 48 wt % of pellets of poly(ethylene terephthalate) which did not substantially contain inert particles and had an intrinsic viscosity of 0.62; 2 wt % of pellets of poly(ethylene terephthalate) which contained 2 wt % of crosslinked divinylbenzene particles having a weight average particle diameter of 0.5 μm and which had an intrinsic viscosity of 0.62; and 20 wt % of pellets of poly(ethylene terephthalate) which contained 2 wt % of y-alumina particles having a weight average particle diameter of 0.025 μm and which had an intrinsic viscosity of 0.62 was dried under vacuum at 180° C. for 3 hours and was then supplied to an extruder heated to 275° C. Subsequently, in a manner equivalent to that in Example 1, a polyester film was formed. The Young's modulus in the longitudinal direction was 6.5 GPa, and the Young's modulus in the width direction was 4.5 GPa.

As shown in Table 1, according to the method described above, a polyester film having high quality in which the numbers of coarse projections H1 and H2 were within the ranges of the present invention could not be formed.

COMPARATIVE EXAMPLE 3

Without using a thermoplastic resin (polymer 2) other than a polyester resin, a mixture of 78 wt % of pellets of poly(ethylene terephthalate) which did not substantially contain inert particles and had an intrinsic viscosity of 0.62; 2 wt % of pellets of poly(ethylene terephthalate) which contained 2 wt % of crosslinked divinylbenzene particles having a weight average particle diameter of 0.5 μm and which had an intrinsic viscosity of 0.62; and 20 wt % of pellets of poly(ethylene terephthalate) which contained 2 wt % of γ-alumina particles having a weight average particle diameter of 0.025 μm and which had an intrinsic viscosity of 0.62 was dried under vacuum at 180° C. for 3 hours and was then supplied to an extruder heated to 275° C. Subsequently, an unstretched film was formed in a manner equivalent to that described in Example 1 except that the conditions described above.

This unstretched film was stretched in two stages using a roll-type stretching apparatus in the longitudinal direction at a stretching ratio of 3.0, at a stretching rate of 60,000%/minute, and at a temperature of 105° C., and was then further stretched using a tenter in the width direction at a stretching ratio of 3.4, at a stretching rate of 3,000%/minute, and at a temperature of 110° C. Subsequently, the film was re-stretched in one stage using a roll-type stretching apparatus in the longitudinal direction at a stretching ratio of 1.4 and at a temperature of 140° C., and was then re-stretched using a tenter in the width direction at a stretching ratio of 1.9 and at a temperature of 195° C. After a heat treatment under the condition of a constant length at 220° C. for 8 seconds was performed, a relaxation treatment was performed at a relaxation rate of 2% in the width direction, thereby yielding a polyester film approximately 6 μm thick. The Young's modulus in the longitudinal direction was 6.8 GPa, and the Young's modulus in the width direction was 5.5 GPa.

polyethylene(2,6-naphthalenedicarboxylate) (PEN) which contained 2 wt % of crosslinked divinylbenzene particles having a weight average particle diameter of 0.5 μm and which had an intrinsic viscosity of 0.65 was dried under vacuum at 180° C. for 3 hours and was then supplied to an extruder heated to 300° C. Subsequently, an unstretched film was formed in a manner equivalent to that described in Example 1 except that the conditions described above.

This unstretched film was stretched in two stages using a roll-type stretching apparatus in the longitudinal direction at a stretching ratio of 4.2, at a stretching rate of 60,000%/minute, and at a temperature of 135° C., and was then further stretched using a tenter in the width direction at a stretching ratio of 3.0, at a stretching rate of 3,000%/minute, and at a temperature of 140° C. After a heat treatment under the condition of a constant length at 220° C. for 8 seconds was performed, a relaxation treatment was performed at a relaxation rate of 2% in the width direction, thereby yielding a polyester film approximately 6 μm thick. The Young's modulus in the longitudinal direction was 7.0 GPa, and the Young's modulus in the width direction was 5.7 GPa.

As shown in Table 1, the polyester film thus formed had inferior dimensional stability in the width direction.

TABLE 1

| | Base Layer Portion Polymer 1/ Polymer 2 (wt %) | Number of Coarse Projections (1/100 cm²) | | Heat Shrinkage (%) (100° C., 30 min) Longitudinal Direction/ Width Direction | Rate of Change in Dimensions in Width Direction (%) | Oligomer-Restraining Property (1/100 cm²) |
|---|---|---|---|---|---|---|
| | | H1 | H2 | | | |
| Example 1 | PET/PEI (= 92.5/7.5) | 60 A | 2 A | 0.7/0.02 A | −0.35 A | 600 A |
| Example 2 | PET/PEI (= 90/10) | 25 A | 4 A | 0.85/0 A | −0.33 A | 800 A |
| Example 3 | PET/PEI (= 90/10) | 33 A | 2 A | 0.7/0.02 A | −0.31 A | 800 A |
| Example 4 | PET/PEI (= 90/10) | 63 A | 7 A | 0.5/0.1 A | −0.37 A | 1000 A |
| Example 5 | PET/PEI (= 90/10) | 70 A | 9 A | 0.5/0.1 A | −0.38 A | 1900 A |
| Example 6 | PET/PEI (= 90/10) | 90 A | 6 A | 0.5/0.1 A | −0.38 A | 1100 A |
| Example 7 | PET/PEI (= 90/10) | 70 A | 9 A | 0.7/0 A | −0.32 A | 900 A |
| Comparative Example 1 | PET/PEI (= 92.5/7.5) | 120 C | 15 C | 0.7/0.01 A | −0.37 A | 900 A |
| Comparative Example 2 | PET/PEI (= 92.5/7.5) | 300 C | 75 C | 0.6/0.02 A | −0.32 A | 1800 A |
| Comparative Example 3 | PET | 15 A | 0 A | 2.4/0.05 C | −0.42 C | 4200 C |
| Comparative Example 4 | PEN | 65 A | 5 A1 | 0.3/0.01 A | −0.53 C | 550 A |

As shown in Table 1, the polyester film thus formed had a large heat shrinkage and inferior oligomer-restraining property.

COMPARATIVE EXAMPLE 4

Without using a thermoplastic resin (polymer 2) other than a polyester resin, a mixture of 98 wt % of pellets of polyethylene(2,6-naphthalenedicarboxylate) (PEN) which did not substantially contain inert particles and had an intrinsic viscosity of 0.65 and 2 wt % of pellets of

EXAMPLE 8

Blend chips of poly(ethylene terephthalate) and poly (ether imide) were formed in a manner equivalent to that in Example 1.

Next, film-formation was performed by using two extruders. A mixture of 20 wt % of the blend chips described above; 58 wt % of pellets of poly(ethylene terephthalate) which did not substantially contain inert particles and had an intrinsic viscosity of 0.62; 3 wt % of pellets of poly(ethylene terephthalate) which contained 2 wt % of crosslinked divinylbenzene particles having a weight average particle diameter of 0.17 μm and which had an intrinsic viscosity of 0.62; and 20 wt % of pellets of poly(ethylene terephthalate) which contained 2 wt % of γ-alumina particles having a weight average particle diameter of 0.025 μm and which had an intrinsic viscosity of 0.62 was dried under vacuum at 180° C. for 3 hours and was then supplied to an extruder A (for A layer) heated to 295° C. A mixture of 20 wt % of the blend chips described above; 67 wt % of pellets of poly(ethylene terephthalate) which did not substantially contain inert particles and had an intrinsic viscosity of 0.62; 12 wt % of pellets of poly(ethylene terephthalate) which contained 2 wt % of spherical silica particles having a weight average particle diameter of 0.17 μm and which had an intrinsic viscosity of 0.62; and 1 wt % of pellets of poly(ethylene terephthalate) which contained 1 wt % of crosslinked divinylbenzene particles having a weight average particle diameter of 0.75 μm and which had an intrinsic viscosity of 0.62 was dried under vacuum at 180° C. for 3 hours and was then supplied to an extruder B (for B layer) heated to 295° C. Subsequently, after the polymer in the extruder A was filtrated sequentially by using a sand filter, a fiber sintered stainless steel filter having a cut of 1.2 μm, and a fiber sintered stainless steel filter having a cut of 0.8 μm in that order, and the polymer in the extruder B was filtrated sequentially by using a sand filter and a fiber sintered stainless steel filter having a cut of 3 μm in that order, these two polymers were fed into a T die, and these two polymers were brought into close contact with a casting drum having a surface temperature of 25° C. so as to be solidified by cooling while static electricity is being applied to the casting drum, whereby an unstretched and two-layered film (the ratio in thickness of A to B was 11 to 1) was obtained.

This unstretched film was stretched in two stages using a roll-type stretching apparatus in the longitudinal direction at a stretching ratio of 3.0, at a stretching rate of 60,000%/minute, and at a temperature of 125° C., and was then further stretched using a tenter in the width direction at a stretching ratio of 3.4, at a stretching rate of 3,000%/minute, and at a temperature of 128° C. Subsequently, the film was re-stretched in one stage using a roll-type stretching apparatus in the longitudinal direction at a stretching ratio of 1.4 and at a temperature of 140° C., and was then re-stretched using a tenter in the width direction at a stretching ratio of 1.9 and at a temperature of 205° C. After a heat treatment under the condition of a constant length at 220° C. for 8 seconds was performed, a relaxation treatment was performed at a relaxation rate of 5% in the width direction, thereby yielding a laminated polyester film approximately 6 μm thick. The thicknesses of the A layer and the B layer were 5.5 μm and 0.5 μm, respectively. The Young's modulus in the longitudinal direction was 6 GPa, and the Young's modulus in the width direction was 4.7 GPa.

As shown in Table 3, this laminated polyester film had superior properties, such as a low rate of change in the dimensions in the width direction and a superior oligomer-restraining property, and in addition, when used as a base film for a metal particles magnetic recording medium, this laminated polyester showed superior properties, such as a small number of dropouts, superior electromagnetic conversion characteristics, and small track deviation.

EXAMPLE 9

An unstretched two-layered film (the ratio in thickness A to B was 11 to 1) was formed in a manner equivalent to that in Example 8 except that, as shown in Table 2, the content of the crosslinked divinylbenzene particles in the A layer was changed to 0.1 wt %, and a polymer for the B layer was changed to poly(ethylene terephthalate) (containing 0.5 wt % of crosslinked divinylbenzene having a weight average particle diameter of 0.3 μm and 0.06 wt % of silica particles having a weight average particle diameter of 0.8 μm).

This unstretched film was stretched in two stages using a roll-type stretching apparatus in the longitudinal direction at a stretching ratio of 3.1, at a stretching rate of 62,000%/minute, and at a temperature of 125° C., and was then further stretched using a tenter in the width direction at a stretching ratio of 3.6, at a stretching rate of 3,300%/minute, and at a temperature of 130° C. Subsequently, the film was re-stretched in one stage using a roll-type stretching apparatus in the longitudinal direction at a stretching ratio of 1.5 and at a temperature of 145° C., and was then re-stretched using a tenter in the width direction at a stretching ratio of 1.9 and at a temperature of 200° C. After a heat treatment under the condition of a constant length at 220° C. for 8 seconds was performed, a relaxation treatment was performed at a relaxation rate of 5% in the width direction, thereby yielding a laminated polyester film approximately 6 μm thick. The thicknesses of the A layer and the B layer were 5.5 μm and 0.5 μm, respectively. The Young's modulus in the longitudinal direction was 6.2 GPa, and the Young's modulus in the width direction was 5.1 GPa.

As shown in Table 3, this laminated polyester film had superior properties, such as a low rate of change in the dimensions in the width direction and a superior oligomer-restraining property, and in addition, when used as a base film for a metal particles magnetic recording medium, this laminated polyester showed superior properties, such as a small number of dropouts, superior electromagnetic conversion characteristics, and small track deviation.

EXAMPLE 10

An unstretched two-layered film (the ratio in thickness of A to B was 11 to 1) was formed in a manner equivalent to the in Example 8 except that the ratio in weight of PET to PEI in the A layer polymer was changed to 85 to 15 as shown in Table 2.

This unstretched film was stretched in two stages using a roll-type stretching apparatus in the longitudinal direction at a stretching ratio of 3.05, at a stretching rate of 50,000%/minute, and at a temperature of 140° C., and was then further stretched using a tenter in the width direction at a stretching ratio of 3.5, at a stretching rate of 2,500%/minute, and at a temperature of 138° C. Subsequently, the film was re-stretched in one stage using a roll-type stretching apparatus in the longitudinal direction at a stretching ratio of 1.55 and at a temperature of 150° C., and was then re-stretched using a tenter in the width direction at a stretching ratio of 1.95 and at a temperature of 205° C. After a heat treatment under the condition of a constant length at 225° C. for 9 seconds was performed, a relaxation treatment was performed at a relaxation rate of 3% in the width direction, thereby yielding a laminated polyester film approximately 6 μm thick. The thicknesses of the A layer and the B layer were 5.5 μm and 0.5 μm, respectively. The Young's modulus in the longitudinal direction was 5.8 GPa, and the Young's modulus in the width direction was 4.8 GPa.

As shown in Table 3, this laminated polyester film had superior properties, such as a low rate of change in the dimensions in the width direction and a superior oligomer-restraining property, and in addition, when used as a base film for a metal particles magnetic recording medium, this laminated polyester showed superior properties, such as a small number of dropouts, superior electromagnetic conversion characteristics, and small track deviation.

EXAMPLE 11

An unstretched two-layered film (the ratio in thickness of A to B was 5 to 1) was formed in a manner equivalent to that in Example 8 except that the A layer polymer was changed to a blend polymer of poly(ethylene-2,6-naphthalenedicarboxylate) (PEN) and PEI (the ratio in weight was 90 to 10, and 0.01 wt % of silica particles having a weight average particle diameter of 0.25 μm was contained), and a blend polymer of PEN and PEI (the ratio in weight was 90 to 10, and 0.5 wt % of crosslinked divinylbenzene having a weight average particle diameter of 0.25 μm and 0.03 wt % of silica particles having a weight average particle diameter of 0.7 μm were contained) was used as the B layer polymer as shown in Table 2.

This unstretched film was stretched in two stages using a roll-type stretching apparatus in the longitudinal direction at a stretching ratio of 3.1, at a stretching rate of 80,000%/minute, and at a temperature of 160° C., and was then further stretched using a tenter in the width direction at a stretching ratio of 4.2, at a stretching rate of 5,000%/minute, and at a temperature of 160° C. Subsequently, the film was re-stretched in one stage using a roll-type stretching apparatus in the longitudinal direction at a stretching ratio of 1.05 and at a temperature of 185° C., and was then re-stretched using a tenter in the width direction at a stretching ratio of 1.75 and at a temperature of 240° C. After a heat treatment under the condition of a constant length at 260° C. for 6 seconds was performed, a relaxation treatment was performed at a relaxation rate of 2% in the width direction, thereby yielding a laminated polyester film approximately 4.2 μm thick. The thicknesses of the A layer and the B layer were 3.5 μm and 0.7 μm, respectively. The Young's modulus in the longitudinal direction was 7.9 GPa, and the Young's modulus in the width direction was 7.1 GPa, respectively.

As shown in Table 3, this laminated polyester film had superior properties, such as a low rate of change in the dimensions in the width direction and a superior oligomer-restraining property, and in addition, when used as a base film for a metal particles magnetic recording medium, this laminated polyester showed superior properties, such as a small number of dropouts, superior electromagnetic conversion characteristics, and small track deviation.

COMPARATIVE EXAMPLE 5

An unstretched film having an A/B laminated structure was formed in a manner equivalent to that in Example 8 except that PET chips which did not substantially contain particles was used as the A layer polymer in place of the blend chips of PET and PEI.

Next, in a manner equivalent to that in Example 8, this unstretched film was stretched in two stages using a roll-type stretching apparatus in the longitudinal direction at a stretching ratio of 3.0, at a stretching rate of 60,000%/minute, and at a temperature of 105° C., and was then further stretched using a tenter in the width direction at a stretching ratio of 3.4, at a stretching rate of 3,000%/minute, and at a temperature of 100° C. Subsequently, the film was re-stretched in one stage using a roll-type stretching apparatus in the longitudinal direction at a stretching ratio of 1.4 and at a temperature of 130° C., and was then re-stretched using a tenter in the width direction at a stretching ratio of 1.90 and at a temperature of 150° C. After a heat treatment under the condition of a constant length at 210° C. for 8 seconds was performed, a relaxation treatment was performed at a relaxation rate of 2% in the width direction, thereby yielding a laminated polyester film approximately 6 μm thick. The thicknesses of the A layer and the B layer were 5.5 μm and 0.5 μm, respectively. The Young's modulus in the longitudinal direction was 6.5 GPa, and the Young's modulus in the width direction was 5.4 GPa.

As shown in Table 3, this laminated polyester film had inferior heat shrinkage and had inferior properties used for the application of a metal particles magnetic recording medium.

COMPARATIVE EXAMPLE 6

An unstretched film was formed by using the same starting materials used in Example 8 except that a filtration method for the A layer polymer was changed to a method which only used a fiber sintered stainless steel filter having a cut of 3 μm. Subsequent stretching and heat treatment were performed in a manner equivalent to that in Example 8, thereby yielding a laminated polyester film approximately 6 μm thick. The thicknesses of the A layer and the B layer were 5.5 μm and 0.5 μm, respectively. The Young's modulus in the longitudinal direction was 6 GPa, and the Young's modulus in the width direction was 4.7 GPa.

As shown in Table 3, the numbers of coarse projections H1 and H2 of this laminated polyester film were out of the ranges of the present invention, and the result of the dropout was also inferior. Hence, this laminated polyester film had inferior properties used for the application of a metal particles magnetic recording medium.

COMPARATIVE EXAMPLE 7

As the A layer polymer, a blend polymer of PET and PEI (the ratio on a weight basis was 60 to 40, and the contents of the particles were equivalent to those in Example 8) was used. However, as the fiber sintered stainless steel having a cut of 1.2 μm could not be used for filtrating the A layer polymer since the extrusion could not be well performed, a method of using a sand filter and a fiber sintered stainless steel filter having a cut of 3 μm was used instead, thereby forming an unstretched film having a two-layered structure. Next, this unstretched film was stretched in two stages in the longitudinal direction at a stretching ratio of 3.5, at a stretching rate of 50,000%/minute, and at a temperature of 180° C., and was then further stretched using a tenter in the width direction at a stretching ratio of 4.5, at a stretching rate of 3,500%/minute, and at a temperature of 180° C. After a heat treatment under the condition of a constant length at 250° C. for 8 seconds was performed, a relaxation treatment was performed at a relaxation rate of 2% in the width direction, thereby yielding a laminated polyester film approximately 6 μm thick. In the step described above, re-stretching in the longitudinal direction and in the width direction as performed in Example 1 could not be performed since the stretching properties of the unstretched film were inferior. The thicknesses of the A layer and the B layer were 5.5 μm and 0.5 μm, respectively. The Young's modulus in the longitudinal direction was 4 GPa, and the Young's modulus in the width direction was 4.4 GPa.

As shown in Table 3, the number of coarse projections H1 of this laminated polyester film was out of the range of the present invention, and the result of the dropout was also inferior. Hence, this laminated polyester film had inferior properties used for the application of a metal particles magnetic recording medium.

TABLE 2

| | A Layer Polymer | Particles in A layer Type of Particle/ Particle Diameter (μm)/ Content (wt %) | Particles in B layer Type of Particle/ Particle Diameter (μm)/ Content (wt %) | Laminate Structure | Surface Roughness Ra (nm) B layer Side Ra(b) | Side Opposite to B Layer Ra(f) | Difference Ra(b) − Ra(f) | Size of Void Dv/D | Number of Coarse Projections (1/100 cm$^2$) H1 | H2 | Extrapolated Glass Transition Temperature of A Layer Polymer Tg$_{onset}$ (° C.) Glass Transition Temperature Tg |
|---|---|---|---|---|---|---|---|---|---|---|---|
| Example 8 | PET/PEI (= 90/10) | DVB*1/0.17/0.06 Alumina/0.025/0.3 | DVB*1/0.17/0.4 Silica/0.75/0.01 | A/B | 9 | 6.5 | 2.5 | 1.9 | 30 A | 2 A | 98, 113 |
| Example 9 | PET/PEI (= 90/10) | DVB*1/0.17/0.1 Alumina/0.025/0.3 | DVB*1/0.3/0.5 Silica/0.8/0.06 | A/B | 13 | 7.5 | 5.5 | 1.9 | 35 A | 4 A | 98, 115 |
| Example 10 | PET/PEI (= 85/15) | DVB*1/0.17/0.06 Alumina/0.025/0.3 | DVB*1/0.17/0.4 Silica/0.75/0.01 | A/B | 9.1 | 7 | 2.1 | 2.3 | 45 A | 3 A | 102, 123 |
| Example 11 | PEN/PEI (= 90/10) | Silica/0.25/0.05 | DVB*1/0.25/0.5 Silica/0.7/0.03 | A/B | 7.5 | 5.3 | 2.2 | 2.4 | 15 A | 0 A | 120, 146 |
| Comparative Example 5 | PET | DVB*1/0.17/0.06 Alumina/0.025/0.3 | DVB*1/0.17/0.24 Silica/0.75/0.01 | A/B | 8.8 | 6.2 | 2.4 | 1.1 | 15 A | 0 A | 85, 106 |
| Comparative Example 6 | PET/PEI (= 90/10) | DVB*1/0.17/0.06 Alumina/0.025/0.3 | DVB*1/0.17/0.24 Silica/0.75/0.01 | A/B | 11 | 7.5 | 3.5 | 1.8 | 120 C | 35 C | 97, 113 |
| Comparative Example 7 | PET/PEI (= 60/40) | DVB*1/0.17/0.06 Alumina/0.025/0.3 | DVB*1/0.17/0.4 Silica/0.75/0.01 | A/B | 15 | 10 | 5 | 8.2 | 110 C | 6 A | 145, 180 |

*1 DVB: Divinylbenzene

TABLE 3

| | Heat shrinkage (%) Longitudinal Direction (80° C./100° C.), Width Direction (80° C./100° C.) | | Rate of Change in Dimensions in Width Direction (%) | | Oligomer-Restraining Properties (1/100 cm$^2$) | | Electromagnetic Conversion Characteristics S/N (d/b) | | Dropout (Number) | | Track Deviation (μm) | | Coated Magnetic Tape Property |
|---|---|---|---|---|---|---|---|---|---|---|---|---|---|
| Example 8 | 0.21/0.7, −0.01/0 | A | −0.32 | A | 800 | A | +0.6 | A | 16 | A | 0.44 | A | A |
| Example 9 | 0.23/0.8, −0.02/0.01 | A | −0.31 | A | 1000 | A | +0.3 | B | 12 | A | 0.42 | A | A |
| Example 10 | 0.17/0.6, 0/0 | A | −0.29 | A | 500 | A | +0.4 | B | 19 | A | 0.30 | A | A |
| Example 11 | 0.20/0.55, −0.01/0 | A | −0.34 | A | 700 | A | +0.8 | A | 8 | A | 0.38 | A | A |
| Comparative Example 5 | 0.4/1.5, 0.04/0.12 | C | −0.39 | A | 3000 | C | 0 | B | 15 | A | 0.87 | C | C |
| Comparative Example 6 | 0.22/0.7, −0.04/0.02 | A | −0.31 | A | 1500 | A | +0.1 | B | 60 | C | 0.47 | A | C |
| Comparative Example 7 | 0.11/0.23, 0/0 | A | −0.22 | A | 200 | A | −2.5 | C | 89 | C | 0.21 | A | C |

EXAMPLE 12

In this example, 50 wt % of pellets of poly(ethylene terephthalate) having a Tg of 80° C. and an intrinsic viscosity of 0.85 formed by a known method and 50 wt % of "Ultem" 1010 having a Tg of 216° C. and an intrinsic viscosity of 0.68 manufactured by General Electric Company were supplied to a vented biaxial extruder, in which the screws were designed to rotate in the same direction and the temperature was maintained at 290° C., and blend chips containing 50 wt % of PEI were produced.

Next, film-formation was performed by using two extruders. A mixture of 20 wt % of the blend chips obtained by the pelletizing step described above and 80 wt % of pellets of poly(ethylene terephthalate) which did not substantially contain inert particles and had an intrinsic viscosity of 0.62 was dried under vacuum at 180° C. for 3 hours and was then supplied to an extruder A heated to 290° C. A mixture of 20 wt % of the blend chips obtained by the pelletizing step described above; 60 wt % of pellets of poly(ethylene terephthalate) which did not substantially contain inert particles and had an intrinsic viscosity of 0.62; and 20 wt % of pellets of poly(ethylene terephthalate) which contained 2 wt % of crosslinked divinylbenzene particles having a weight average particle diameter of 0.25 μm and which had an intrinsic viscosity of 0.62 was dried under vacuum at 180° C. for 3 hours and was then supplied to an extruder B heated to 295° C. Subsequently, after the polymer in the extruder A was filtrated sequentially by using a sand filter, a fiber sintered stainless steel filter having a cut of 1.2 μm, and a fiber sintered stainless steel filter having a cut of 0.8 μm in that order, and the polymer in the extruder B was filtrated sequentially by using a sand filter, and a fiber sintered stainless steel filter having a cut of 3 μm in that order, these two polymers were fed into a rectangular confluent block (feed block) for forming an A/B laminate. The thicknesses of the individual layers were adjusted by controlling the extrusion amount by adjusting the rotation numbers of gear pumps equipped in the individual lines. By using an electrostatic casting method, the laminate thus formed was wound around a casting drum having a surface temperature of 25° C. so as to be solidified by cooling, thereby yielding an unstretched two-layered film (thickness ratio A/B was 10/1).

This unstretched film was stretched using a roll-type stretching apparatus in the longitudinal direction at a stretching ratio of 3.1 and at a temperature of 110° C. This stretching was performed by using a difference in peripheral velocity between two sets of rollers. An aqueous solution having the composition described below was applied to the A layer of this uniaxially stretched film.

| | |
|---|---|
| Methyl cellulose | 0.10 wt % |
| A water-soluble polyester | 0.3 wt % |
| Aminoethyl silane coupling agent | 0.01 wt % |
| Carnauba wax | 0.2 wt % |
| Acrylic Particles having a weight average particle diameter of 20 nm | 0.02 wt % |
| Coating concentration of solid component | 20 mg/m$^2$ |

In addition, this stretched film was further stretched by using a tenter in the width direction at a stretching ratio of 3.4 and at a temperature of 100° C. Subsequently, the film was re-stretched in one stage using a roll-type stretching apparatus in the longitudinal direction at a stretching ratio of 1.55 and at a temperature of 150° C., and was then re-stretched using a tenter in the width direction at a stretching ratio of 1.6 and at a temperature of 195° C. After a heat treatment under the condition of a constant length at 205° C. for 8 seconds was performed, a relaxation treatment was performed at a relaxation rate of 5% in the width direction, thereby yielding a laminated polyester film approximately 6 $\mu$m thick. The thickness of the A layer and the B layer were 5.5 $\mu$m and 0.5 $\mu$m, respectively. The Young's modulus in the longitudinal direction was 5.2 GPa, and the Young's modulus in the width direction was 6.1 GPa.

As shown in Table 6, this laminated polyester film had a low rate of change in the dimensions in the width direction and a superior oligomer-restraining property, and in addition, when used as a base film for a metal evaporated magnetic recording medium, this laminated polyester showed superior properties, such as superior electromagnetic conversion characteristics, and deposition stability.

EXAMPLE 13

As shown in Table 4, an unstretched two-layered film (the ratio A/B in thickness was 11/1) was formed in which the A layer polymer and the B layer polymer in Example 12 were used.

This unstretched film was stretched by the same stretching method, stretching temperature, and stretching ratio as those in Example 12, and a laminated polyester film approximately 6 $\mu$m thick was formed. However, the content of the aminoethyl silane coupling agent in the aqueous solution used for coating was changed from 0.01 to 0.15 wt %, and 0.03 wt % of ultra-fine silica having a weight average particle diameter of 12 nm was used as inert particles in place of the acrylic particles. The thicknesses of the A layer and the B layer were 5.5 $\mu$m and 0.5 $\mu$m, respectively. The Young's modulus in the longitudinal direction was 5.1 GPa, and the Young's modulus in the width direction was 6.2 GPa.

As shown in Table 6, this laminated polyester film had a low rate of change in the dimensions in the width direction and a superior oligomer-restraining property, and in addition, when used as a base film for a metal evaporated magnetic recording medium, this laminated polyester showed superior properties, such as superior electromagnetic conversion characteristics, and deposition stability.

EXAMPLE 14

An unstretched two-layered film (the ratio A/B in thickness was 11/1) was formed in a manner equivalent to that in Example 12 except that the weight ratio of PET to PEI in the A layer and the B layer was changed to 85 to 15, and the inert particles contained in the B layer was changed to aluminum silicate particles having a weight average particle diameter of 0.18 $\mu$m at a content of 0.95 wt %.

Next, this unstretched film was stretched using a roll-type stretching apparatus in the longitudinal direction at a stretching ratio of 3.05 and at a temperature of 120° C., and an aqueous solution having the same composition as that used in Example 12 except that the inert particles were changed to ultra-fine silica having a weight average particle diameter of 18 nm at a content of 0.16 wt % was applied to the stretched film. This stretched film was then stretched using a tenter in the width direction at a stretching ratio of 3.4 and at a temperature of 105° C. Subsequently, the film was re-stretched by a roll-type stretching apparatus in the longitudinal direction at a stretching rate of 1.7 and at a temperature of 150° C., and was then re-stretched using a tenter in the width direction at a stretching rate of 1.7 and at a temperature of 200° C. After a heat treatment under the condition of a constant length at 200° C. for 8 seconds was performed, a relaxation treatment was performed at a relaxation rate of 3% in the width direction, thereby yielding a laminated polyester film approximately 6 $\mu$m thick. The thicknesses of the A layer and the B layer were 5.5 $\mu$m and 0.5 $\mu$m, respectively. The Young's modulus in the longitudinal direction was 5.0 GPa, and Young's modulus in the width direction was 5.7 GPa.

As shown in Table 6, this laminated polyester film had a low rate of change in the dimensions in the width direction and a superior oligomer-restraining property, and in addition, when used as a base film for a metal evaporated magnetic recording medium, this laminated polyester showed superior properties, such as superior electromagnetic conversion characteristics, and deposition stability.

EXAMPLE 15

In this example, film-formation was performed by using three extruders. As shown in Table 4, the polymer compositions and the contents of particles of the A and the B layers were the same as those in Example 12, and as the D layer polymer, a mixture of 20 wt % of the blend chips containing 50 wt % of PEI, 5 wt % of poly(ethylene terephthalate) which did not substantially contain inert particles and which had an intrinsic viscosity of 0.62, and 75 wt % of poly (ethylene terephthalate) which contained 1 wt % of crosslinked divinylbenzene having a weight average particle diameter of 25 nm and which had an intrinsic viscosity of 0.62 was used. The B and the D layers contained 0.3 wt % of dodecylbenzene sodium sulfonate, and the A layer contained 0.1 wt % thereof. In addition, the methods for filtrating the A layer polymer and the B layer polymer were equivalent to those described in Example 1, and the D layer polymer was filtrated sequentially by using a sand filter, a fiber sintered stainless steel filter having a cut of 1.2 $\mu$m, and a fiver sintered stainless steel filter having a cut of 0.8 $\mu$m in that order. As a result, an unstretched three-layered film (the thickness ratio of D, A, and B was 0.15, 11, and 1) was formed.

A laminated polyester film approximately 6.1 μm thick was obtained from this unstretched film by the same stretching method, stretching temperature, stretching ratio, and so on as those described in Example 12. However, the coating of the aqueous solution described in Example 12 was not performed. The thicknesses of the A layer, the B layer, and the D layer were 5.5 μm, 0.5 μm, and 0.075 μm, respectively. The Young's modulus in the longitudinal direction was 5.2 GPa, and the Young's modulus in the width direction was 6.1 GPa.

As shown in Table 6, this laminated polyester film had a low rate of change in the dimensions in the width direction and a superior oligomer-restraining property, and in addition, when used as a base film for a metal evaporated magnetic recording medium, this laminated polyester showed superior properties, such as superior electromagnetic conversion characteristics, and deposition stability.

EXAMPLE 16

As shown in Table 4, an unstretched three-layered film (the ratio in thickness of D, A, and B was 0.2, 10, and 1) was formed in a manner equivalent to that in Example 15 except that the A layer polymer, the B layer polymer, and D layer polymer were changed to a blend polymer of poly(ethylene-2,6-naphthalenedicarboxylate) (PEN) and PEI (the ratio in weight was 90 to 10), the inert particles in the D layer were changed to ultra fine silica particles having a weight average particle diameter of 30 nm at a content of 1.2 wt %, the inert particles in the B layer were changed to aluminum silicate particles having a weight average particle diameter of 0.18 μm at a content of 0.5 wt %, and the temperatures of the three extruders were all changed to 320° C.

This unstretched film was stretched using a roll-type stretching apparatus in the longitudinal direction at a stretching ratio of 4.5 and at a temperature of 135° C., and was then further stretched using a tenter in the width direction at a stretching ratio of 5.5 and at a temperature of 130° C. Subsequently, after a heat treatment under the condition of a constant length at 240° C. for 6 seconds was performed, a relaxation treatment was performed at a relaxation rate of 2% in the width direction, thereby yielding a polyester film approximately 4.5 μm thick. In this example, re-stretching was not performed in the longitudinal direction and in the width direction. The thicknesses of the A layer, the B layer, and the D layer were 4 μm, 0.4 μm, and 0.08 μm, respectively. The Young's modulus in the longitudinal direction was 7.2 GPa, and the Young's modulus in the width direction was 7.5 GPa.

As shown in Table 6, this laminated polyester film had a low rate of change in the dimensions in the width direction and a superior oligomer-restraining property, and in addition, when used as a base film for a metal evaporated magnetic recording medium, this laminated polyester showed superior properties, such as superior electromagnetic conversion characteristics, and deposition stability.

EXAMPLE 17

As shown in Table 4, an unstretched three-layered film (the ratio in thickness of D, A, and B was 0.1, 15, and 1) was formed in a manner equivalent to that in Example 15 except that the A layer polymer, the B layer polymer, and D layer polymer were changed to a blend polymer of PET and PEI (the ratio in weight was 80 to 20), the inert particles in the B layer were changed to crosslinked divinylbenzene particles having a weight average particle diameter of 0.2 μm at a content of 0.2 wt %, and the inert particles in the D layer were changed to ultra-fine silica particles having a weight average particle diameter of 20 nm at a content of 1.5 wt.

This unstretched film was stretched using a roll-type stretching apparatus in the longitudinal direction at a stretching ratio of 3 and at a temperature of 125° C., and was then further stretched using a tenter in the width direction at a stretching ratio of 3.3 and at a temperature of 115° C. Subsequently, the film was re-stretched in the longitudinal direction by a roll-type stretching apparatus at a stretching ratio of 1.8 and at a temperature of 155° C., and was then re-stretched in the width direction using a tenter at a stretching ratio of 1.7 and at a temperature of 200° C. Next, after a heat treatment under the condition of a constant length at 200° C. for 8 seconds was performed, a relaxation treatment was performed at a relaxation rate of 3% in the width direction, thereby yielding a laminated polyester film approximately 8 μm thick. The thicknesses of the A layer, the B layer, and the D layer were 7.5 μm, 0.5 μm, and 0.05 μm, respectively. The Young's modulus in the longitudinal direction was 4.9 GPa, and the Young's modulus in the width direction was 5.4 GPa.

As shown in Table 6, this laminated polyester film had a low rate of change in the dimensions in the width direction and a superior oligomer-restraining property, and in addition, when used as a base film for a metal evaporated magnetic recording medium, this laminated polyester showed superior properties, such as superior electromagnetic conversion characteristics, and deposition stability.

EXAMPLE 18

As shown in Table 4, an unstretched two-layered film (the ratio in thickness of A to B was 11 to 1) was formed in a manner equivalent to that in Example 12 except that the A layer polymer and the B layer polymer were changed to a blend polymer of PET and PEI (the ratio in weight was 70 to 30), and the inert particles in the B layer were changed to aluminum silicate particles having a weight average particle diameter of 0.18 μm at a content of 0.35 wt %.

This unstretched film was stretched using a roll-type stretching apparatus in the longitudinal direction at a stretching ratio of 3.05 and at a temperature of 130° C., and after an aqueous solution having the same composition as that in Example 12 except that the inert particles were changed to ultra-fine silica having a weight average particle diameter of 12 nm at a content of 0.035 wt % was applied, the stretched film was then further stretched at 110° C. in the width direction using a tenter at a stretching ratio of 3.5. Subsequently, the film was re-stretched at 155° C. in the longitudinal direction by a roll-type stretching apparatus at a stretching ratio of 1.75, and was then re-stretched at 200° C. in the width direction using a tenter at a stretching ratio of 1.8. Next, after a heat treatment under the condition of a constant length at 205° C. for 8 seconds was performed, a relaxation treatment was performed at a relaxation rate of 2% in the width direction, thereby yielding a laminated polyester film approximately 6 μm thick. The thicknesses of the A layer and the B layer were 5.5 μm and 0.5 μm, respectively. The Young's modulus in the longitudinal direction was 4.8 GPa, and the Young's modulus in the width direction was 5.2 GPa.

As shown in Table 6, this laminated polyester film had a low rate of change in the dimensions in the width direction and a superior oligomer-restraining property, and in addition, when used as a base film for a metal evaporated magnetic recording medium, this laminated polyester showed superior properties, such as superior electromagnetic conversion characteristics, and deposition stability.

EXAMPLE 19

As shown in Table 4, the A layer polymer was changed to a blend polymer of PEN and PEI (the ratio of PEN to PEI was 92 to 8), and the B layer polymer and D layer polymer were changed to PEN. An unstretched three-layered film (the ratio in thickness of D, A, and B was 0.2, 7.5, and 1) was formed in a manner equivalent to that in Example 16 except that the inert particles in the B layer were changed to crosslinked divinylbenzene particles having a weight average particle diameter of 0.2 μm at a content of 0.17 wt %, and the inert particles in the D layer were changed to ultra-fine silica particles having a weight average particle diameter of 45 nm at a content of 0.5 wt.

A laminated polyester film approximately 3.5 μm thick was formed from this unstretched film by the same stretching conditions as those in Example 16. The thicknesses of the A layer, the B layer, and the D layer were 3 μm, 0.4 μm, and 0.08 μm, respectively. The Young's modulus in the longitudinal direction was 7.1 GPa, and the Young's modulus in the width direction was 7.4 GPa.

As shown in Table 6, this laminated polyester film had a low rate of change in the dimensions in the width direction and a superior oligomer-restraining property, and in addition, when used as a base film for a metal evaporated magnetic recording medium, this laminated polyester showed superior properties, such as superior electromagnetic conversion characteristics, and deposition stability.

COMPARATIVE EXAMPLE 8

An unstretched A/B laminated film was formed in a manner equivalent to that in Example 12 except that PET was used for the A layer polymer and the B layer polymer instead of a blend polymer of PET and PEI. In addition, the temperatures of both extruders were set to 280° C.

Next, in a manner equivalent to that in Example 12, this unstretched film was stretched at 105° C. using a roll-type stretching apparatus in the longitudinal direction at a stretching ratio of 3.1, and after an aqueous solution similar to that in Example 12 was applied, the stretched film was then further stretched at 95° C. in the width direction using a tenter at a stretching ratio of 3.4. Subsequently, the film was re-stretched at 150° C. in the longitudinal direction by a roll-type stretching apparatus at a stretching ratio of 1.55, and was then re-stretched at 190° C. in the width direction using a tenter at a stretching ratio of 1.6. Next, after a heat treatment under the condition of a constant length at 210° C. for 8 seconds was performed, a relaxation treatment was performed at a relaxation rate of 5% in the width direction, thereby yielding a polyester film approximately 6 μm thick. The thicknesses of the A layer and the B layer were 5.5 μm and 0.5 μm, respectively. The Young's modulus in the longitudinal direction was 5.3 GPa, and the Young's modulus in the width direction was 6.7 GPa.

As shown in Table 6, this laminated polyester film had inferior heat shrinkage and oligomer-restraining property, and in addition, this laminated polyester film had inferior properties as a film for the metal evaporated magnetic recording medium.

COMPARATIVE EXAMPLE 9

An unstretched three-layered film was formed in a manner equivalent to that in Example 12 except that PET was used for the A layer polymer, and a blend polymer of PET and PEI (the weight ratio of PET to PEI was 90 to 10) was used for the B layer polymer and the D layer polymer.

Next, in a manner equivalent to that in Comparative Example 8, this unstretched film was stretched, thereby yielding a laminated polyester film approximately 6.1 μm thick. However, an aqueous solution was not applied to the film. The thicknesses of the A layer and the B layer were 5.5 μm and 0.5 μm, respectively. The Young's modulus in the longitudinal direction was 5.2 GPa, and the Young's modulus in the width direction was 6.5 GPa.

As shown in Table 6, this laminated polyester film had inferior heat shrinkage and oligomer-restraining property, and in addition, this laminated polyester film had inferior properties as a film for the metal evaporated magnetic recording medium.

COMPARATIVE EXAMPLE 10

A laminated polyester film approximately 6 μm thick was formed in a manner equivalent to that in Example 12 except that the inert particles in the B layer were changed to spherical silica having a weight average particle diameter 1.1 μm at a content of 0.1 wt % as shown in Table 5. The thicknesses of the A layer and the B layer were 5.5 μm and 0.5 μm, respectively. The Young's modulus in the longitudinal direction was 5.2 GPa, and the Young's modulus in the width direction was 6.1 GPa.

As shown in Table 6, the number H2 of the projections of this laminated polyester film was out of range of the present invention, and this laminated polyester film had inferior properties as a film for the metal evaporated magnetic recording medium.

COMPARATIVE EXAMPLE 11

As shown in Table 5, the weight ratio of PET/PEI for the A layer, the B layer, and the D layer was changed to 60 to 40, the inert particles in the D layer were changed to ultra-fine spherical silica particles having a weight average particle diameter of 30 nm at a content of 3.1 wt %, the filtration methods for the polymers of the individual layers were changed to a method which only used a fiber sintered stainless steel filter having a cut of 3 μm, and an unstretched three-layered film was formed. Re-stretching properties in the longitudinal direction and in the width direction were inferior under the stretching conditions equivalent to those in Example 15, and film breakage frequently occurred. Accordingly, the unstretched film was stretched at 110° C. in the longitudinal direction by a roll-type stretching apparatus at a stretching rate of 3.5 and was further stretched at 100° C. in the width direction using a tenter at a stretching rate of 4.5. Next, after a heat treatment under the condition of a constant length at 205° C. for 7 seconds was performed, a relaxation treatment was performed at a relaxation rate of 5% in the width direction, thereby yielding a laminated polyester film approximately 6.1 μm thick. The thicknesses of the A layer, the B layer, and the D layer were 5.5 μm, 0.5 μm, and 0.075 μm, respectively. The Young's modulus in the longitudinal direction was 4.1 GPa, and the Young's modulus in the width direction was 4.9 GPa.

As shown in Table 6, the numbers H1 and H2 of the projections of this laminated polyester film were out of the ranges of the present invention, and this laminated polyester film had inferior properties as a film for the metal evaporated magnetic recording medium.

COMPARATIVE EXAMPLE 12

An unstretched three-layered film was formed in a manner equivalent to that in Example 15 as shown in Table 5.

This unstretched film was stretched at 110° C. in the longitudinal direction by a roll-type stretching apparatus at a stretching rate of 3.5 and was further stretched at 100° C. in the width direction using a tenter at a stretching rate of 4.5. Next, after a heat treatment under the condition of a constant length at 205° C. for 7 seconds was performed, a relaxation treatment was performed at a relaxation rate of 5% in the width direction, thereby yielding a laminated polyester film approximately 2.4 μm thick. Re-stretching in the longitudinal direction and in the width direction was not performed. The Young's modulus in the longitudinal direction was 5.1 GPa, and the Young's modulus in the width direction was 5.5 GPa.

As shown in Table 6, the numbers H1 and H2 of the projections of this laminated polyester film were out of the ranges of the present invention, and this laminated polyester film had inferior properties as a film for the metal evaporated magnetic recording medium.

COMPARATIVE EXAMPLE 13

As shown in Table 5, a blend polymer of PET and PEI (the ration in weight was 90 to 10) containing 0.03 wt % of silica particles having a weight average particle diameter of 60 nm was used for the A layer polymer, PET containing 0.4 wt % of aluminum silicate particles having a weight average particle diameter of 0.25 μm was used for the B layer polymer, the filtration method for the A layer was a known method which performed filtration once using a fiber sintered stainless steel filter having a cut of 3 μm, and an unstretched two-layered film (the ratio in thickness A to B was 4 to 1) was formed.

This unstretched film was stretched at 95° C. in the longitudinal direction at a stretching ratio of 3.2. This stretching was performed by using a difference in peripheral velocity between two sets of rollers. An aqueous solution having the composition described below was applied to the A layer of this uniaxially stretched film.

| | |
|---|---|
| Methyl cellulose | 0.10 wt % |
| A water-soluble polyester | 0.3 wt % |
| Aminoethyl silane coupling agent | 0.01 wt % |
| Ultra-fine silica having a weight average particle diameter of 12 nm | 0.03 wt % |
| Concentration of solid component | 20 mg/m² |

This unstretched film was stretched at 115° C. in the width direction-using a tenter at a stretching rate of 3.4. Next, this film was further stretched at 140° C. in the longitudinal direction at a stretching rate of 1.5, after a heat treatment under the condition of a constant length at 220° C. for 5 seconds was performed, a relaxation treatment was performed at a relaxation rate of 5% in the width direction, thereby yielding a laminated polyester film approximately 5 μm thick. The thicknesses of the A layer and the B layer were 4 μm and 1 μm, respectively. The Young's modulus in the longitudinal direction was 5.3 GPa, and the Young's modulus in the width direction was 5.4 GPa.

As shown in Table 6, the numbers H1 and H2 of the projections of this laminated polyester film were out of the ranges of the present invention, and this laminated polyester film had inferior properties as a film for the metal evaporated magnetic recording medium.

COMPARATIVE EXAMPLE 14

As shown in Table 5, PET containing substantially no particles was used for the A layer polymer, PET containing 0.3 wt % of crosslinked divinylbenzene particles having a weight average particle diameter of 0.2 μm was used for the B layer polymer, a blend polymer of PET and PEI (the ration in weight was 90 to 10) containing 0.3 wt % of silica having a weight average particle diameter of 30 nm was used for the D layer polymer, and the filtration method for the D layer was a known method which performed filtration once by using a fiber sintered stainless steel filter having a cut of 3 μm, and an unstretched three-layered film (the ratio in thickness D, A, and B was 0.05, 3.95, and 1) was formed.

This unstretched film was stretched at 95° C. in the longitudinal direction at a stretching rate of 3.2. This stretching was performed by using a difference in peripheral velocity between two sets of rollers. Subsequently, this stretched film was stretched at 100° C. in the width direction using a tenter at a stretching rate of 4.5. Next, the stretched film was further stretched at 140° C. in the longitudinal direction at a stretching rate of 1.5, and after a heat treatment under the condition of a constant length at 220° C. for 5 seconds was performed, a relaxation treatment was performed at a relaxation rate of 7% in the width direction, thereby yielding a laminated polyester film approximately 5 μm thick. The thicknesses of the A layer, the B layer, and the D layer were 3.95 μm, 1 μm, and 0.05 μm, respectively. The Young's modulus in the longitudinal direction was 5.5 GPa, and the Young's modulus in the width direction was 5.6 GPa.

As shown in Table 6, the number H2 of the projections of this laminated polyester film was out of the range of the present invention, the oligomer-restraining property was inferior, and this laminated polyester film had inferior properties as a-film for the metal evaporated magnetic recording medium.

COMPARATIVE EXAMPLE 15

A laminated polyester film approximately 9.9 μm thick was formed in a manner equivalent to that in Example 15 except that the inert particles in the D layer were changed to spherical silica particles having a weight average particle diameter of 30 nm at a content of 3.1 wt %, and the inert particles in the B layer were changed to aluminum silicate particles having a weight average particle diameter of 0.18 μm at a content of 0.5 wt %. The thicknesses of the A layer, the B layer, and the D layer were 9 μm, 0.8 μm, and 0.1 am, respectively. The Young's modulus in the longitudinal direction was 5.1 GPa, and the Young's modulus in the width direction was 6.2 GPa.

As shown in Table 6, the number H1 of the projections of this laminated polyester film was out of the range of the present invention, the heat shrinkage and the oligomer-restraining property were inferior, and this laminated polyester film had inferior properties as a film for the metal evaporated magnetic recording medium.

As has thus been described, the polyester film of the present invention can be used for a magnetic recording tape, a capacitor tape, thermal transfer ribbon, a thermally sensitive stencil film, and the like. In particular, when used as a base film of magnetic recording media, the film shows superior properties, such as small number of dropouts, superior dimensional stability, and a superior oligomer-restraining property, whereby the film of the present invention has significantly important value in the industrial fields.

TABLE 4

| | A Layer Polymer | Particles in C layer Type of Particle/ Particle Diameter (μm)/ Content (10,000/mm²) | Particles in D layer Type of Particle/ Particle Diameter (μm)/ Content (wt %) | Particles in B layer Type of Particle/ Particle Diameter (μm)/ Content (wt %) | Laminate Structure | Film Thickness (μm) | Surface Roughness Ra (nm) B Layer Ra(b) | Surface Roughness Ra (nm) Side Opposite to B Layer Ra(f) | Number of Projections 5 to 25 nm in height at f Surface Side (10,000/cm²) | Number of Coarse Projections (1/100 cm²) H1 | Number of Coarse Projections (1/100 cm²) H2 | Extrapolated Glass Transition Temperature of A Layer Polymer Tg$_{onset}$ (° C.) Glass Transition Temperature Tg |
|---|---|---|---|---|---|---|---|---|---|---|---|---|
| Example 12 | PET/PEI (= 90/10) | Acrylic/18/850 | No D Layer | DVB*1/ 0.27/0.3 | C/A/B (Two Layers) | 6 | 14.5 | 1.6 | 980 | 30 A | 0 A | 98, 113 |
| Example 13 | PET/PEI (= 90/10) | Silica/12/6000 | No D Layer | DVB*1/ 0.27/0.3 | C/A/B (Two Layers) | 6 | 14.5 | 2.4 | 4800 | 35 A | 1 A | 98, 114 |
| Example 14 | PET/PEI (= 85/15) | Silica/18/800 | No D Layer | Aluminum Silicate/ 0.18/0.95 | C/A/B (Two Layers) | 6 | 18.5 | 1.65 | 1200 | 45 A | 3 A | 103, 124 |
| Example 15 | PET/PEI (= 90/10) | No C Layer | Silica/25/0.75 | DVB*1/ 0.27/0.3 | D/A/B (Three Layers) | 6.1 | 14.5 | 1.7 | 970 | 25 A | 0 A | 99, 114 |
| Example 16 | PEN/PEI (= 90/10) | No C Layer | Silica/30/1.2 | Aluminum Silicate/ 0.18/0.5 | D/A/B (Three Layers) | 4.5 | 10.5 | 2.3 | 980 | 60 A | 2 A | 122, 148 |
| Example 17 | PET/PEI (= 80/20) | No C Layer | Silica/20/1.5 | DVB*1/ 0.2/0.2 | D/A/B (Three Layers) | 8 | 8.4 | 2.9 | 4300 | 58 A | 4 A | 110, 138 |
| Example 18 | PET/PEI (= 70/30) | Silica/12/7000 | No D Layer | Aluminum Silicate/ 0.18/0.35 | C/A/B (Two Layers) | 6 | 6.5 | 4.5 | 6700 | 66 A | 5 A | 100, 115 |
| Example 19 | PEN/PEI (= 92/8) | No C Layer | Silica/45/0.5 | DVB*1/ 0.2/0.17 | D/A/B (Three Layers) | 3.5 | 7.3 | 2.7 | 350 | 22 A | 0 A | 120, 145 |

1* DVB: Divinylbenzene

TABLE 5

| | A Layer Polymer | Particles in C layer Type of Particle/ Diameter (μm)/ Content (10,000 Pieces/mm²) | Particles in D layer Type of Particle/ Particle Diameter (μm)/ Content (wt %) | Particles in B layer Type of Particle/ Diameter (μm)/ Content (wt %) | Laminate Structure | Film Thickness (μm) | Surface Roughness Ra (nm) B Layer Ra(b) | Surface Roughness Ra (nm) Side Opposite to B Layer Ra(f) | Number of Projections 5 to 25 nm in height at f Surface Side (10,000/cm²) | Number of Coarse Projections (1/100 cm²) H1 | Number of Coarse Projections (1/100 cm²) H2 | Extrapolated Glass Transition Temperature of A Layer Polymer Tg$_{onset}$ (° C.) Glass Transition Temperature Tg |
|---|---|---|---|---|---|---|---|---|---|---|---|---|
| Comparative Example 8 | PET | Acrylic/18/850 | No D Layer | DVB*1/ 0.27/0.3 | C/A/B (Two Layers) | 6 | 14.3 | 1.6 | 980 | 15 A | 0 A | 84, 102 |
| Comparative Example 9 | PET | No C Layer | Silica/25/0.75 | DVB*1/ 0.27/0.3 | D/A/B (Three Layers) | 6.1 | 14.4 | 1.7 | 970 | 25 A | 0 A | 83, 101 |
| Comparative Example 10 | PET/PEI (= 90/10) | Acrylic/18/850 | No D Layer | Silica/ 1.1/0.1 | C/A/B (Two Layers) | 6 | 21 | 1.6 | 1020 | 89 A | 35 C | 98, 113 |
| Comparative Example 11 | PET/PEI (= 60/40) | No C Layer | Silica/30/3.1 | DVB*1/ 0.27/0.3 | D/A/B (Three Layers) | 6.1 | 18.5 | 4.8 | 3500 | 110 C | 13 C | 151, 178 |
| Comparative Example 12 | PET/PEI (= 60/40) | No C Layer | Silica/25/0.75 | DVB*1/ 0.27/0.3 | D/A/B (Three Layers) | 2.5 | 20.4 | 16.2 | 650 | 145 C | 40 C | 98, 114 |

TABLE 5-continued

| | A Layer Polymer | Particles in C layer Type of Particle/ Diameter (μm)/ Content (10,000 Pieces/mm²) | Particles in D layer Type of Particle/ Particle Diameter (μm)/ Content (wt %) | Particles in B layer Type of Particle/ Particle Diameter (μm)/ Content (wt %) | Laminate Structure | Film Thickness (μm) | Surface Roughness Ra (nm) B Layer Ra(b) | Surface Roughness Ra (nm) Side Opposite to B Layer Ra(f) | Number of Projections 5 to 25 nm in height at f Surface Side (10,000/cm²) | Number of Coarse Projections (1/100 cm²) H1 | Number of Coarse Projections (1/100 cm²) H2 | Extrapolated Glass Transition Temperature of A Layer Polymer Tg$_{onset}$ (°C.) Glass Transition Temperature Tg |
|---|---|---|---|---|---|---|---|---|---|---|---|---|
| Comparative Example 13 | PET/PEI (= 90/10) | Silica/12/7200 | No D Layer | Aluminum Silicate/ 0.25/0.4 | C/A/B (Two Layers) | 5 | 15.3 | 2.2 | 4800 | 110 C | 35 C | 98, 114 |
| Comparative Example 14 | PET | No C Layer | Silica/30/0.3 | DVB*1/ 0.2/0.3 | D/A/B (Three Layers) | 5 | 7.8 | 4.5 | 250 | 85 A | 15 C | 83, 101 |
| Comparative Example 15 | PET/PEI (= 90/10) | No C Layer | Silica/30/3.1 | Aluminum Silicate/ 0.18/0.5 | D/A/B (Three Layers) | 9.9 | 10.5 | 4.8 | 7200 | 110 C | 8 A | 99, 114 |

1* DVB: Divinylbenzene

TABLE 6

| | Heat Shrinkage (100° C., 30 min) Longitudinal Direction/Width Direction (%) | | Oligomer-Restraining Property (1/100 cm²) | | Rate of Change in Dimensions in Width Direction (%) | | Electromagnetic Conversion Characteristic S/N (dB) | | Deposition Stability | Deposited Magnetic Tape Property |
|---|---|---|---|---|---|---|---|---|---|---|
| Example 12 | 0.5/0.1 | A | 800 | A | −0.36 | A | +0.5 | A | A | A |
| Example 13 | 0.5/0.1 | A | 700 | A | −0.35 | A | +0.8 | A | A | A |
| Example 14 | 0.35/0 | A | 400 | A | −0.33 | A | +0.2 | B | A | A |
| Example 15 | 0.5/0.1 | A | 1600 | A | −0.36 | A | +0.5 | A | A | A |
| Example 16 | 0.15/0 | A | 1800 | A | −0.38 | A | +1.6 | A | B | A |
| Example 17 | 0.25/0 | A | 1100 | A | −0.34 | A | +0.6 | A | B | A |
| Example 18 | 0.18/0 | A | 150 | A | −0.34 | A | +0.1 | B | A | A |
| Example 19 | 0.18/0 | A | 90 | A | −0.39 | A | +0.7 | A | A | A |
| Comparative Example 8 | 1.8/0.6 | C | 2500 | C | −0.42 | C | ±0 | B | B | C |
| Comparative Example 9 | 1.6/0.5 | C | 4500 | C | −0.39 | A | −0.1 | B | C | C |
| Comparative Example 10 | 0.5/0.1 | A | 800 | A | −0.36 | C | −0.4 | B | C | C |
| Comparative Example 11 | 0.2/0 | A | 900 | A | −0.38 | A | −1.2 | C | C | C |
| Comparative Example 12 | 0.33/0 | A | 1100 | A | −0.37 | A | −3 | C | C | C |
| Comparative Example 13 | 0.6/0.15 | A | 2000 | A | −0.36 | A | −1.3 | C | B | C |
| Comparative Example 14 | 0.5/0.1 | A | 1600 | A | −0.42 | C | +0.2 | B | C | C |
| Comparative Example 15 | 0.5/0.1 | A | 1700 | A | −0.38 | A | −0.7 | C | C | C |

What is claimed is:

1. A polyester film comprising:
a polyester resin; and
a thermoplastic resin other than a polyester resin, wherein said thermoplastic resin is at least one thermoplastic resin selected from the group consisting of a polyimide resin, a polysulfone resin, and a poly(ether sulfone) resin;
wherein the number H1 of coarse projections having a height of 0.28 μm or more per 100 cm² of at least one surface of the polyester film, and the number H2 of coarse projections having a height of 0.56 μm or more per 100 cm² of said at least one surface of the polyester film satisfy the conditions:

$0 \leq H1 \leq 100$ and $0 \leq H2 \leq 10$.

2. A polyester film according to claim 1,
wherein the polyester resin and the thermoplastic resin form a base layer portion, and
further comprising a first laminated portion provided on at least one surface of the base layer portion.

3. A polyester film according to claim 1, wherein the polyester resin comprises an ethylene terephthalate unit or ethylene(2,6-naphthalenedicarboxylate) unit as a primary component.

4. A polyester film according to claim 3, wherein the polyester resin comprises an ethylene terephthalate unit as a primary component.

5. A polyester film according to claim 1, wherein the thermoplastic resin has a glass transition temperature which is equal to or higher than that of the polyester resin.

6. A polyester film according to claim 1, wherein the thermoplastic resin is the polyimide resin.

7. A polyester film according to claim 6, wherein the polyimide resin is a poly(ether imide) resin.

8. A polyester film according to claim 1, wherein the content of the thermoplastic resin in the polyester film is 1 to 30 wt %.

9. A polyester film according to claim 1, wherein the content of the thermoplastic resin in the polyester film is 5 to 30 wt %.

10. A polyester film according to claim 1, wherein the polyester film has an extrapolated glass transition-starting temperature of 90 to 150° C.

11. A polyester film according to claim 1, further comprising particles having a ratio of the actual average particle diameter Dv to the weight average particle diameter D of 1 to 3.

12. A polyester film according to claim 2, wherein the base layer portion comprises 0.001 to 1 wt % of particles having a weight average particle diameter D of 0.001 to 0.5 $\mu$m, and the first laminated portion comprises 0.001 to 3 wt % of particles having a weight average particle diameter D of 0.01 to 1.0 $\mu$m.

13. A polyester film according to claim 2, wherein the base layer portion comprises a polyester resin and a polyimide resin, and the surface roughness Ra(b) at the first laminated portion side and the surface roughness Ra(f) at the side opposite to the first laminated portion satisfy the formulas below, 3 nm$\leq$Ra(b)$\leq$15 nm, 0.5 nm$\leq$Ra(f)$\leq$10 nm, and 1 nm$\leq$Ra(b)−Ra(f)$\leq$7 nm.

14. A polyester film according to claim 2, wherein the base layer portion comprises a polyester resin and a polyimide resin, projections having a height of 5 to 25 nm exist on an f surface opposite to the first laminated portion of the polyester film at a density of 5,000,000 to 70,000,000/mm$^2$, and the surface roughness Ra(f) at the f surface side and the surface roughness Ra(b) of the surface at the first laminated portion side satisfy the formulas below, 0.1 nm$\leq$Ra(f)$\leq$5 nm, and 5 nm$\leq$Ra(b)$\leq$20 nm.

15. A polyester film according to claim 2, wherein the base layer portion comprises a polyester resin and a polyimide resin, the first laminated portion is provided on one surface of the base layer portion and comprises 0.05 to 1.5 wt % of particles having a weight average particle diameter of 0.05 to 1 $\mu$m and a polyester resin or a material composed of a polyester resin and a polyimide resin, and further comprising a layer which is provided on at least the surface opposite to the first laminated portion of the polyester film and which comprises a water-soluble polymer and particles having a weight average particle diameter of 7 to 25 nm at a content of 3,000,000 to 70,000,000/mm$^2$.

16. A polyester film according to claim 2, wherein the base layer portion comprises a polyester resin and a polyimide resin, the first laminated portion is provided on one surface of the base layer portion and comprises 0.05 to 1.5 wt % of particles having a weight average particle diameter of 0.05 to 1 $\mu$m and a polyester resin or a material composed of a polyester resin and a polyimide resin, and further comprising a second laminated portion which is provided on the polyester film at the side opposite to the first laminated portion and which comprises 0.1 to 3 wt % of particles having a weight average particle diameter of 10 to 50 nm and a polyester resin or a material composed of a polyester resin and a polyimide resin, whereby a structure having at least three layers is formed.

17. A polyester film according to claim 1, wherein the total thickness of the polyester film is 1 to 15 $\mu$m.

18. A polyester film according to claim 1, wherein the total thickness of the polyester film is 3 to 8 $\mu$m.

19. A polyester film according to claim 1, wherein the Young's modulus in the longitudinal direction is 5.5 GPa or more, and the sum of the Young's moduli in the longitudinal direction and in the width direction is 10 to 25 GPa.

20. A polyester film according to claim 1, wherein the Young's modulus in the longitudinal direction is 4.3 GPa or more, the Young's modulus in the width direction is 4.7 GPa or more, and the sum of the Young's moduli in the longitudinal direction and in the width direction is 9 to 20 GPa.

21. A polyester film according to claim 1, wherein the heat shrinkage of the polyester film in the longitudinal direction at 100° C. for 30 minutes is 1.2% or less, and the heat shrinkage in the width direction at 100° C. for 30 minutes is 0.5% or less.

22. A polyester film according to claim 1, wherein the heat shrinkage of the polyester film in the longitudinal direction at 80° C. for 30 minutes is 0.3% or less, and the heat shrinkage in the width direction at 80° C. for 30 minutes is 0.1% or less.

23. A polyester film according to claim 1, wherein, when the polyester film is held under the conditions of a temperature of 60° C. and a relative humidity of 80% for 72 hours while being subjected to a load of 26 MPa in the longitudinal direction, the rate of change in the dimensions in the width direction is in the range of −0.4 to 0%.

24. A polyester film according to claim 1, wherein the polyester film is used for a magnetic recording medium.

25. A magnetic recording medium comprising:

a polyester film according to claim 1; and a magnetic layer provided on at least one surface of the polyester film.

26. A magnetic recording medium according to claim 25, wherein the magnetic layer comprises a ferromagnetic metal thin-film.

27. A magnetic recording medium according to claim 25, wherein the magnetic layer comprises finely powdered ferromagnetic hexagonal ferrite dispersed in a bonding agent.

28. A digital recording type cassette tape comprising a magnetic recording medium according to claim 25.

29. A polyester film having a thickness of 3 to 8 $\mu$m and used for a magnetic recording medium, comprising:

a base layer portion comprising a polyester resin and a polyimide resin;

a first laminated portion which is provided on one surface of the base layer portion and which contains 0.05 to 1.5 wt % of particles having a weight average particle diameter of 0.05 to 1 $\mu$m and a polyester resin or a material composed of a polyester resin and a polyimide resin, the base layer portion and the laminated portion forming a base film; and a layer which is provided on at least the surface opposite to the first laminated portion of the base film and which contains a water-soluble polymer and inert particles having a weight average particle diameter of 7 to 25 nm at a content of 3,000,000 to 70,000,000/mm².

30. A polyester film having a thickness of 3 to 8 μm and used for a magnetic recording medium, comprising:
   a base layer portion comprising a polyester resin and a polyimide resin;
   a first laminated portion which is provided on one surface of the base layer portion and which contains 0.05 to 1.5 wt % of particles having a weight average particle diameter of 0.05 to 1 μm and a polyester resin or a material composed of a polyester resin and a polyimide resin, the base layer portion and the laminated portion forming a base film; and
   a second laminated portion which is provided on the base film at the side opposite to the first laminated portion and which contains 0.1 to 3 wt % of particles having a weight average particle diameter of 10 to 50 nm and a polyester resin or a material composed of a polyester resin and a polyimide resin, whereby a structure having at least three layers is formed.

31. A method for manufacturing a polyester film comprising:
   a step of filtrating a polymer mixture comprising a polyester resin and a polyimide resin through a fiber sintered stainless steel filter having a cut of 1.2 μm or less in an extruder;
   a step of melt-extruding the polymer mixture through an extruding die for forming an unstretched film by using the extruder;
   a step of stretching the unstretched film in the longitudinal direction at a stretching temperature of Tg+10° C. to Tg+30° C., at a stretching ratio of 2.5 to 4.0, and at a stretching rate of 50,000%/minute to 200,000%/minute in at least two stages;
   a step of stretching the stretched film in the width direction at a stretching temperature of Tg+10° C. to Tg+50° C., at a stretching ratio of 3.0 to 4.5, and at a stretching rate of 2,000%/minute to 10,000%/minute;
   a step of further stretching the stretched film in the longitudinal direction at a stretching temperature of Tg+30° C. to Tg+50° C., and at a stretching ratio of 1.2 to 1.8;
   a step of further stretching the stretched film in the width direction at a stretching temperature of Tg+80° C. to Tg+110° C., and at a stretching ratio of 1.2 to 2.0; and
   a step of performing heat treatment at a temperature of Tg+100° C. to Tg+125° C. for 0.2 to 10 seconds.

* * * * *